United States Patent
Nara et al.

(10) Patent No.: US 10,872,174 B2
(45) Date of Patent: Dec. 22, 2020

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Minato-ku (JP)

(72) Inventors: Ryuta Nara, Fuchu (JP); Takeshi Kawabata, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 240 days.

(21) Appl. No.: 16/117,321

(22) Filed: Aug. 30, 2018

(65) Prior Publication Data
US 2019/0294827 A1 Sep. 26, 2019

(30) Foreign Application Priority Data
Mar. 20, 2018 (JP) .................................. 2018-052628

(51) Int. Cl.
*G06F 21/74* (2013.01)
*G06F 12/0877* (2016.01)

(52) U.S. Cl.
CPC .......... *G06F 21/74* (2013.01); *G06F 12/0877* (2013.01); *G06F 2212/603* (2013.01)

(58) Field of Classification Search
CPC combination set(s) only.
See application file for complete search history.

(56) References Cited

U.S. PATENT DOCUMENTS

| | | | |
|---|---|---|---|
| 9,524,189 B2 | 12/2016 | Kanai et al. | |
| 9,928,185 B2 | 3/2018 | Murata | |
| 2004/0177261 A1* | 9/2004 | Watt | G06F 12/1491 713/193 |
| 2006/0184804 A1* | 8/2006 | Varma | G06F 12/1425 713/193 |
| 2007/0016832 A1* | 1/2007 | Weiss | G06F 21/554 714/100 |
| 2008/0005794 A1* | 1/2008 | Inoue | G06F 21/52 726/22 |
| 2009/0119541 A1* | 5/2009 | Inoue | G06F 11/2028 714/10 |
| 2013/0283353 A1* | 10/2013 | Ignatchenko | H04L 63/08 726/4 |
| 2014/0123320 A1* | 5/2014 | Isozaki | G06F 21/44 726/29 |

(Continued)

FOREIGN PATENT DOCUMENTS

| | | |
|---|---|---|
| JP | 01-314337 | 12/1989 |
| JP | 2014-191509 A | 10/2014 |

(Continued)

*Primary Examiner* — Lynn D Feild
*Assistant Examiner* — Richard A McCoy
(74) *Attorney, Agent, or Firm* — Oblon, McClelland, Maier & Neustadt, L.L.P.

(57) ABSTRACT

According to an embodiment, an information processing device operates while switching between a secure mode and a non-secure mode. The information processing device includes processing circuitry. The processing circuitry is configured to function as a switching unit. The switching unit switches a mode from the secure mode to the non-secure mode at the time when the information processing device is operating in the secure mode.

9 Claims, 23 Drawing Sheets

(56) References Cited

U.S. PATENT DOCUMENTS

| | | | | |
|---|---|---|---|---|
| 2014/0298026 A1* | 10/2014 | Isozaki | ............... | G06F 21/53 |
| | | | | 713/171 |
| 2017/0004084 A1* | 1/2017 | Kim | ............... | G06F 12/0831 |
| 2018/0081712 A1 | 3/2018 | Kanai et al. | | |
| 2018/0217941 A1* | 8/2018 | Horovitz | ............ | G06F 12/1441 |
| 2018/0239896 A1* | 8/2018 | Kato | ............... | G06F 12/14 |
| 2019/0102538 A1* | 4/2019 | Gentili | ............... | G06F 13/28 |

FOREIGN PATENT DOCUMENTS

| | | |
|---|---|---|
| JP | 2015-170887 | 9/2015 |
| JP | 2016-012801 | 1/2016 |
| JP | 2016-045596 | 4/2016 |
| JP | 2016-143120 | 8/2016 |

\* cited by examiner

FIG.4

TABLE OF CORRESPONDENCE — 32

| PHYSICAL ADDRESS | CACHE ADDRESS |
|---|---|
| x0001 | #0001 |
| x0002 | #0002 |
| ⋮ | ⋮ |
| ⋮ | ⋮ |
| ⋮ | ⋮ |
| ⋮ | ⋮ |
| ⋮ | ⋮ |
| ⋮ | ⋮ |
| | |
| | |
| | |
| ⋮ | ⋮ |
| ⋮ | ⋮ |
| xFFFF | #FFFF |

14A — 18A

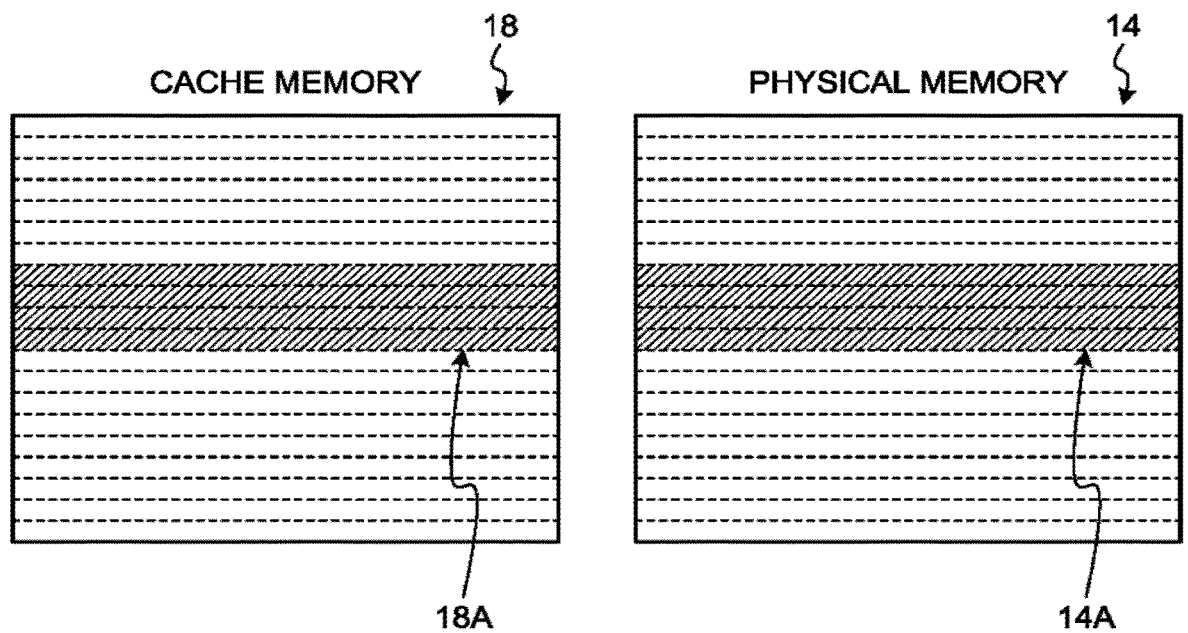

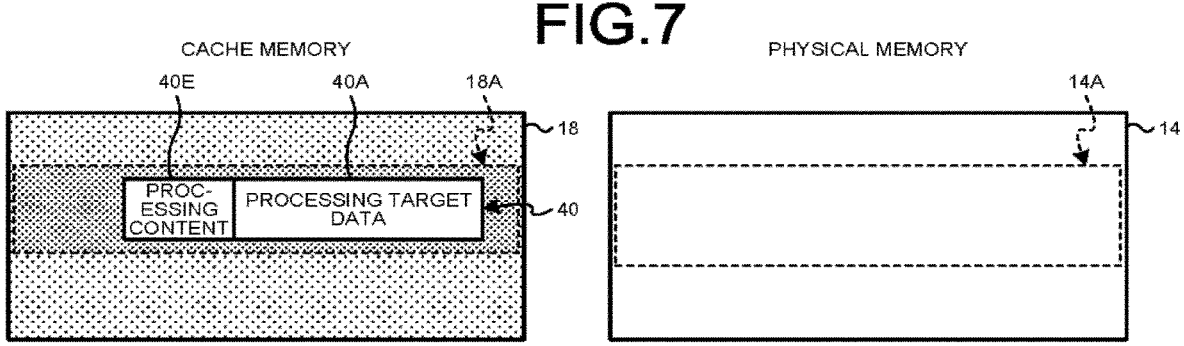
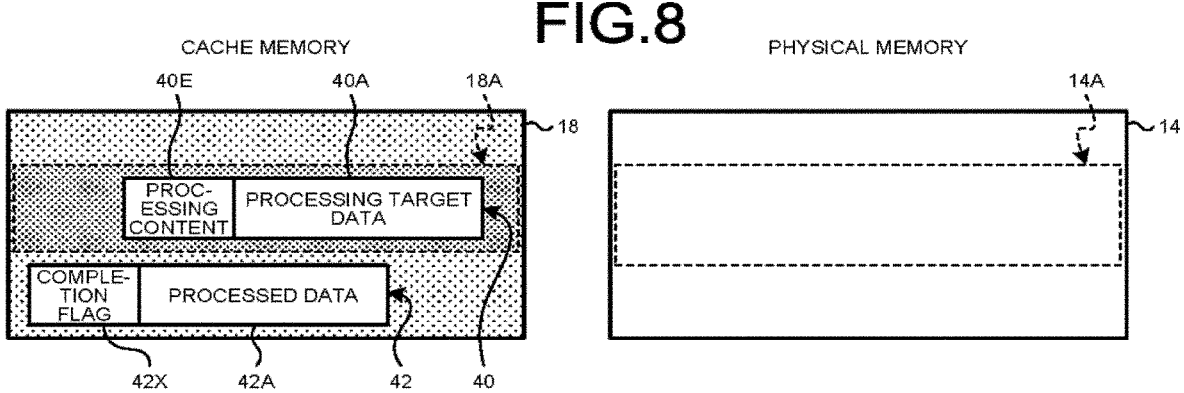
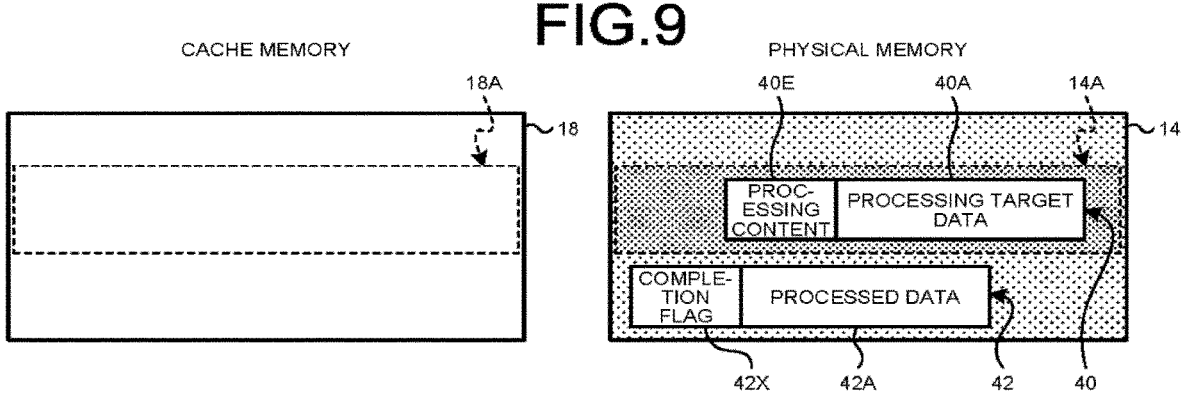
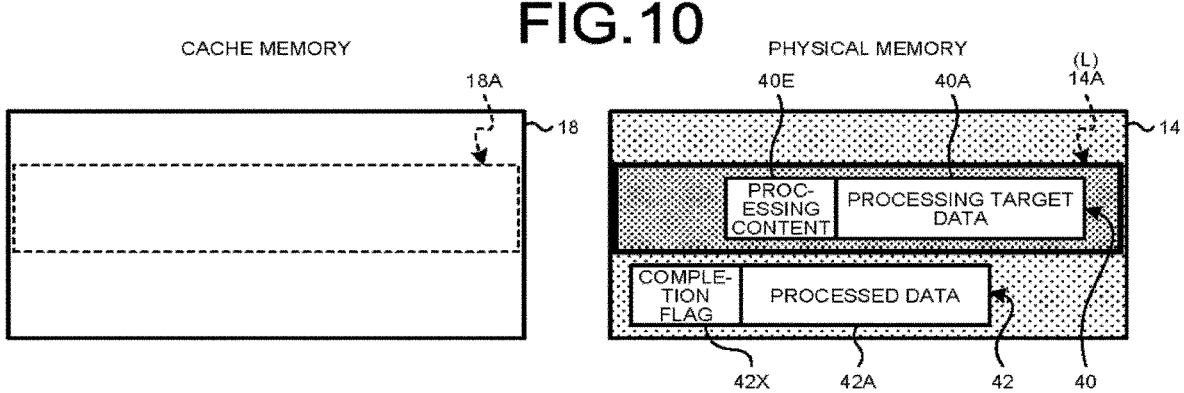

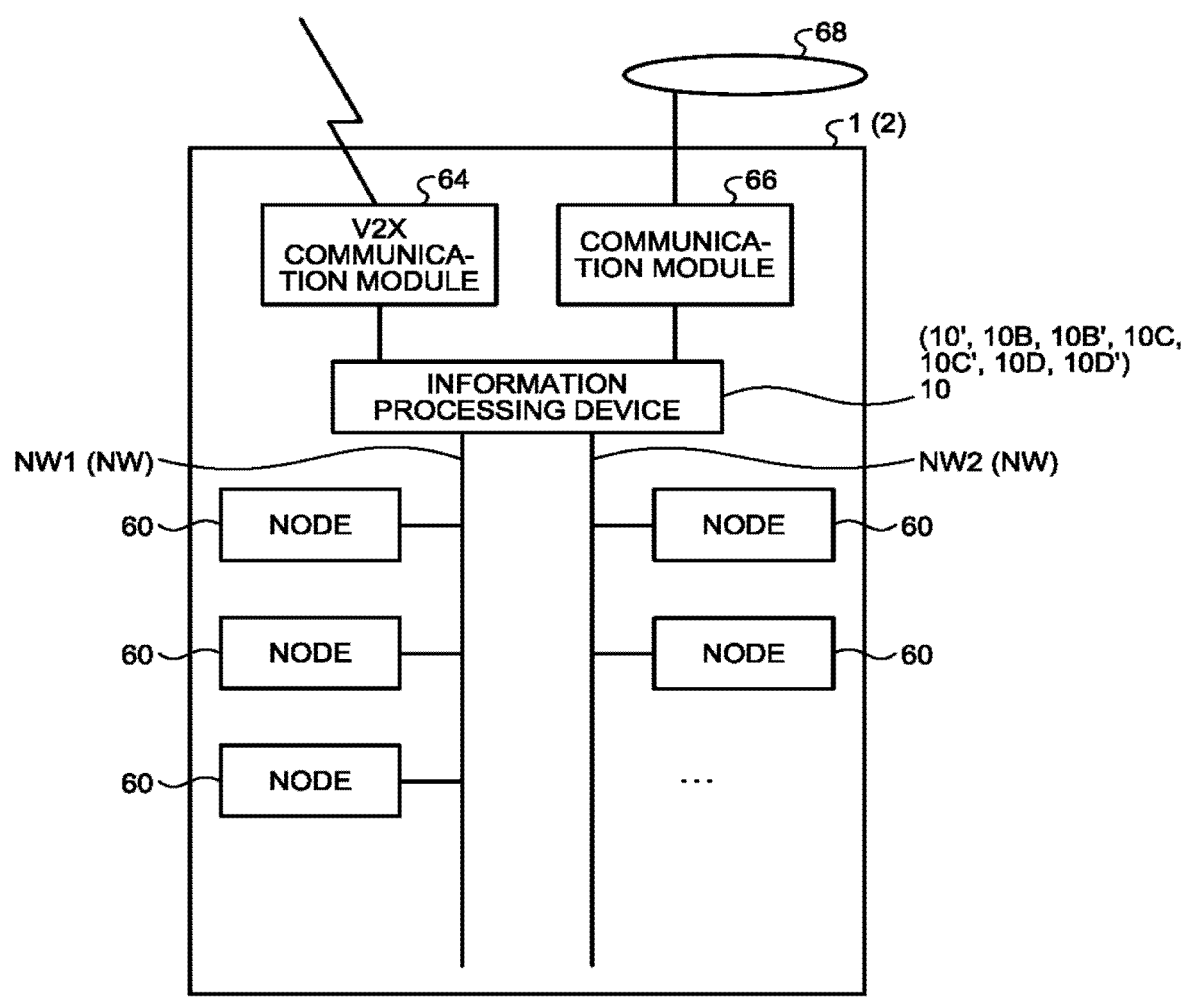

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-052628, filed on Mar. 20, 2018; the entire contents of which are incorporated herein by reference.

FIELD

Embodiments described herein relate generally to an information processing device, an information processing method, and a computer program product.

BACKGROUND

Conventionally, there is known a virtualization technology for an information processing device. By using the virtualization technology, a plurality of operating systems (OSs) can be executed in parallel with a single information processing device. There is disclosed a technology for switching an OS by using the virtualization technology. For example, there is known a technology for performing processing by switching between an OS operating in a secure mode and an OS operating in a non-secure mode. In this technology, the mode is switched from the secure mode to the non-secure mode when processing in the secure mode is ended, and processing in the non-secure mode is executed.

To seek real-time performance, the processing needs to be continued by switching between the non-secure mode and the secure mode as needed in some cases. However, conventionally, the mode is switched to another mode after waiting the processing in one mode is ended, and the real-time performance is lowered in some cases.

BRIEF DESCRIPTION OF THE DRAWINGS

FIG. 4 is a schematic diagram of a table of correspondence;

FIG. 5 is a schematic diagram of a cache memory and a physical memory;

FIG. 6 is a schematic diagram of a memory access control table;

FIG. 7 is a schematic diagram of the cache memory and the physical memory;

FIG. 8 is a schematic diagram of the cache memory and the physical memory;

FIG. 9 is a schematic diagram of the cache memory and the physical memory;

FIG. 10 is a schematic diagram of the cache memory and the physical memory;

FIG. 31 is a schematic diagram of the information processing system according to a fifth modification.

DETAILED DESCRIPTION

According to an embodiment, an information processing device operates while switching between a secure mode and a non-secure mode. The information processing device includes processing circuitry. The processing circuitry is configured to function as a switching unit. The switching unit switches a mode from the secure mode to the non-secure mode at the time when the information processing device is operating in the secure mode.

The following describes an embodiment of an information processing device, an information processing method, and a computer program product with reference to the drawings.

First Embodiment

Figure 1:
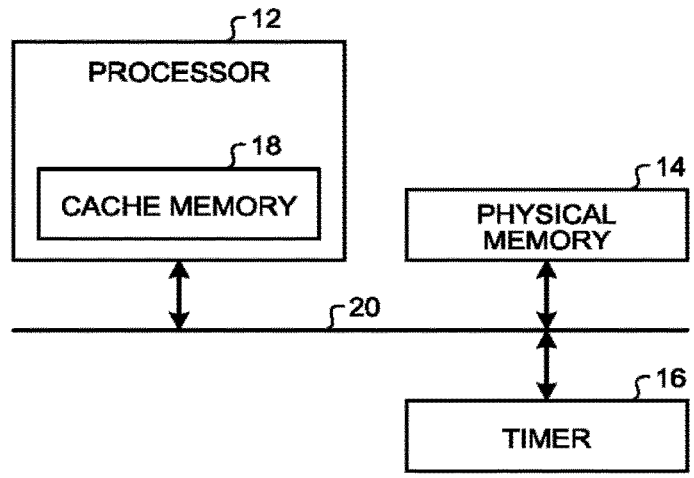
FIG. 1 is a hardware configuration diagram of an information processing device according to a first embodiment.

FIG. 1 is a diagram illustrating a hardware configuration example of an information processing device 10 according to a first embodiment. The information processing device 10 includes a processor 12, a physical memory 14, and a timer 16. The processor 12, the physical memory 14, and the timer 16 are connected to each other via a bus 20.

The processor 12 incorporates a computer system as an integrated circuit, and executes various control processes in accordance with a computer program (software) operating on the computer system. The processor 12 is, for example, a central processing unit (CPU) or a microprocessor. The processor 12 includes a cache memory 18.

The physical memory 14 stores various kinds of data. The physical memory 14 is, for example, a dynamic random access memory (DRAM), a static random access memory (SRAM), and a magnetoresistive random access memory (MRAM). The timer 16 is a device for performing time counting.

Figure 2:
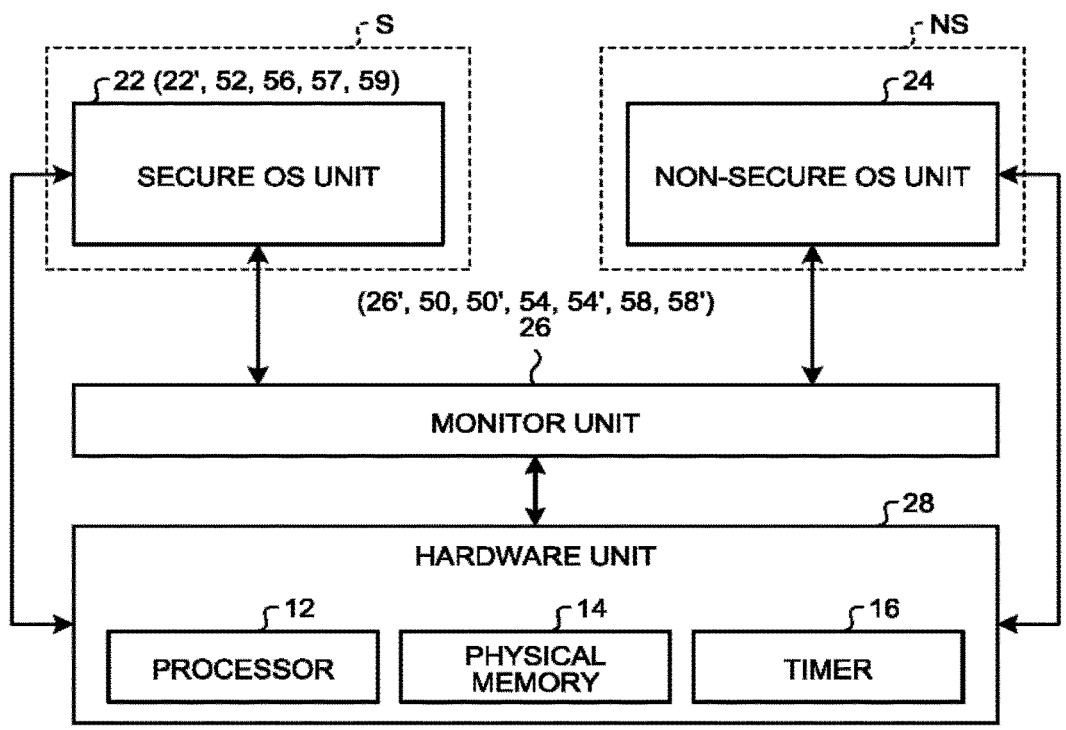
FIG. 2 is a schematic diagram of a functional configuration of the information processing device according to the first embodiment.

FIG. 2 is a diagram illustrating an outline of a functional configuration of the information processing device 10 according to the first embodiment. The information processing device 10 includes a secure operating system (OS) unit 22, a non-secure OS unit 24, a monitor unit 26, and a hardware unit 28.

The hardware unit 28 is a portion related to hardware in the information processing device 10, and includes the processor 12, the physical memory 14, and the like.

In the present embodiment, the processor 12 has a function of executing a plurality of OSs. In the present embodiment, the processor 12 can separately execute computer programs in two modes, that is, a secure mode and a non-secure mode. That is, the processor 12 can cause different OSs or applications to operate in the secure mode and the non-secure mode. That is, the information processing device 10 according to the present embodiment operates while switching between the secure mode and the non-secure mode.

The secure mode is a mode for causing an OS or an application having a minimum risk of vulnerability incorporation to operate. In the following description, the mode is referred to as a secure mode S. A non-secure mode NS is a mode that causes an OS or an application to operate, the OS or application having high performance and being easily utilized as compared with that in the secure mode S, but having a large code scale and vulnerability easily caused. In the following description, the mode is referred to as the non-secure mode NS.

The information processing device 10 according to the present embodiment includes the secure OS unit 22 as an OS operating in the secure mode S. The secure OS unit 22 functions when the processor 12 executes a secure OS.

The information processing device 10 includes the non-secure OS unit 24 as an OS operating in the non-secure mode NS. The non-secure OS unit 24 functions when the processor 12 executes a non-secure OS.

The monitor unit 26 functions when the processor 12 executes a monitor program. The monitor unit 26 switches the mode to the secure mode S or the non-secure mode NS. Specifically, the monitor unit 26 provides a virtual machine to the secure OS unit 22 or the non-secure OS unit 24, and causes the secure OS unit 22 or the non-secure OS unit 24 to operate on the virtual machine. That is, the monitor unit 26 switches the mode so that either the secure OS unit 22 or the non-secure OS unit 24 is validated to function. The monitor unit 26 switches the mode due to calling from the secure OS unit 22 or the non-secure OS unit 24, or an interrupt from the hardware unit 28 and the like.

In the present embodiment, the non-secure OS unit 24 functions as a real-time OS. Thus, in the information processing device 10 according the present embodiment, the mode is switched from the secure mode S to the non-secure mode NS during processing performed by the secure OS unit 22 (details will be described later).

Figure 3:
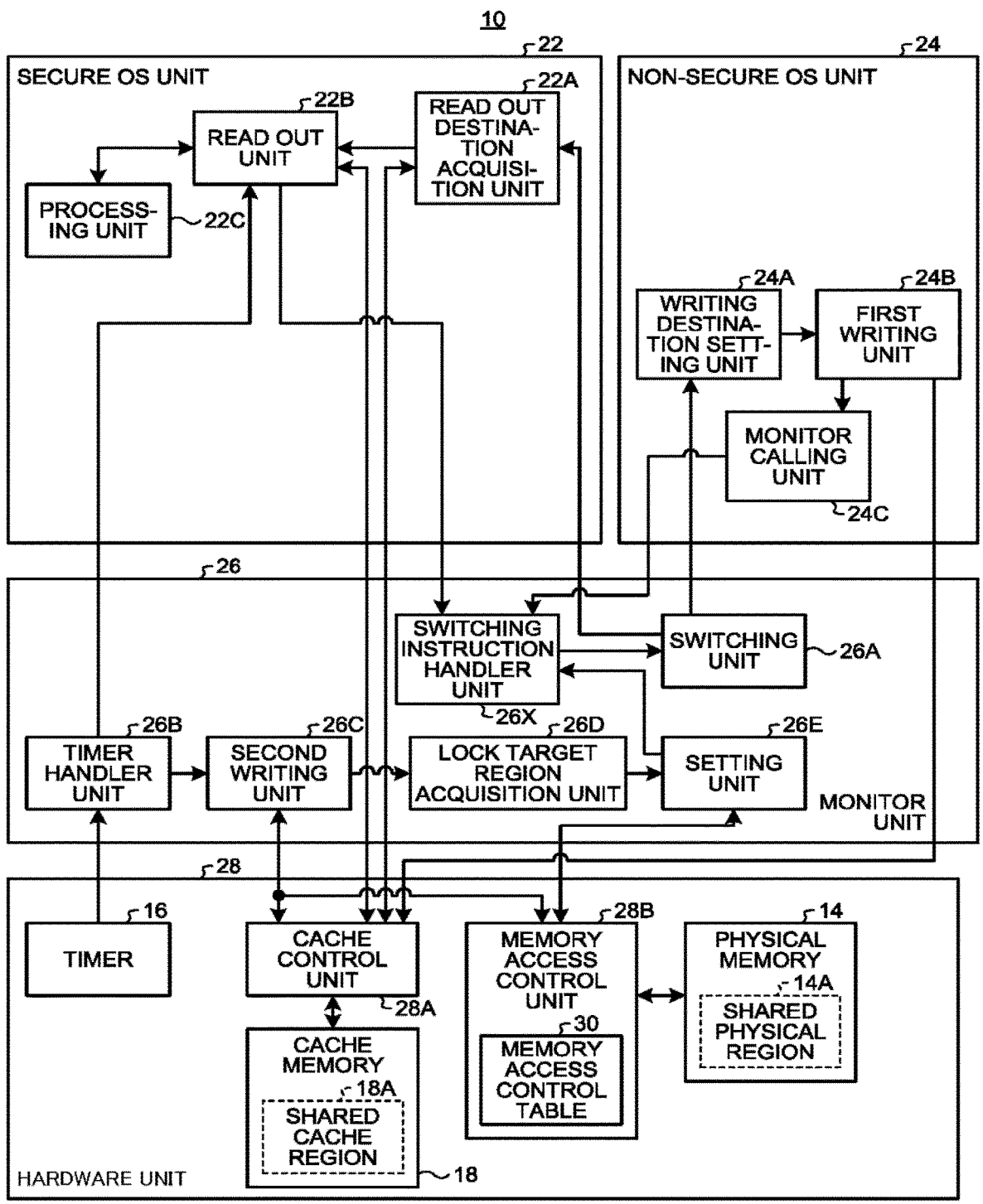
FIG. 3 is a diagram of a functional configuration of the information processing device according to the first embodiment.

FIG. 3 is a diagram illustrating an example of a functional configuration of the information processing device 10 according to the first embodiment.

The hardware unit 28 includes the timer 16, the cache memory 18, the physical memory 14, a cache control unit 28A, and a memory access control unit 28B.

The cache memory 18 previously includes a shared cache region 18A. The shared cache region 18A is a region shared and utilized by the secure OS unit 22 and the non-secure OS unit 24. The physical memory 14 previously includes a shared physical region 14A. The shared physical region 14A is a region shared and utilized by the secure OS unit 22 and the non-secure OS unit 24.

In the present embodiment, the hardware unit 28 employs a write-back cache system. The write-back cache system is a system of writing, only into the cache memory 18, data instructed to be written. The write-back cache system is called write-back in some cases. Writing of data (data movement) into the physical memory 14 from the cache memory 18 is performed at the timing when a predetermined condition is satisfied.

Thus, when receiving a writing instruction into the physical memory 14, the hardware unit 28 writes the data into the cache memory 18, and moves the data from the cache memory 18 to the physical memory 14 when the predetermined condition is satisfied. The predetermined condition is, for example, every predetermined time, a case in which idle time of processing is generated, a case in which a certain time has elapsed after cache access, and a case of receiving a data movement instruction from the cache memory 18 to the physical memory 14. In the present embodiment, exemplified is a case in which the predetermined condition is every predetermined time.

The information processing device 10 holds a table of correspondence in which an address of the cache memory 18 (hereinafter, referred to as a cache address) is associated with an address of the physical memory 14 (hereinafter, referred to as a physical address) in advance.

FIG. 4 is a schematic diagram illustrating an example of a table of correspondence 32. The table of correspondence 32 is information indicating a corresponding relation between the physical address of the physical memory 14 and the cache address of the cache memory 18. At the time of write-back cache, each piece of data stored in a region indicated by each cache address in the cache memory 18 is written into each region indicated by a corresponding physical address described in the table of correspondence 32 in the physical memory 14. The corresponding relation between the physical address of the physical memory 14 and the cache address of the cache memory 18 may be one-to-one correspondence or many-to-one correspondence.

In the table of correspondence 32, the shared physical region 14A in the cache memory 18 is previously associated with the physical address indicating the shared physical region 14A of the physical memory 14. Thus, as illustrated in FIG. 5, the data in the shared cache region 18A of the cache memory 18 is written into the shared physical region 14A of the physical memory 14.

Returning to FIG. 3, the description will be continued. The cache control unit 28A controls access to the cache memory 18. The memory access control unit 28B controls access(writing and reading) to the physical memory 14. The memory access control unit 28B manages a memory access control table 30, and controls access to the physical memory 14 based on the memory access control table 30.

FIG. 6 is a schematic diagram illustrating an example of data configuration of the memory access control table 30.

The memory access control table 30 is a table in which the physical address, a data size, and state information are associated with each other. A data format of the memory access control table 30 is not limited to the table. For example, the memory access control table 30 may be a database.

As described above, the physical address indicates an address in the physical memory 14. The data size indicates a size of data that is stored in the physical memory 14 using a corresponding physical address as a starting position.

The state information is information indicating a state of accessibility with respect to the data stored at a corresponding physical address in a corresponding data size. In the present embodiment, the state information indicates a locked state or an unlocked state.

The locked state is a state in which writing of the data instructed to be written by the non-secure OS unit 24 is disabled, and reading from the non-secure OS unit 24 enabled. In other words, the locked state indicates that writing of the data instructed to be written by the non-secure OS unit 24 is disabled. As described above, in the present embodiment, the hardware unit 28 employs the write-back cache system. Thus, in the present embodiment, the locked state indicates that the data written into the cache memory 18 by the non-secure OS unit 24 is not enabled to be written into the physical memory 14 from the cache memory 18.

Even in the locked state, reading from the non-secure OS unit 24 or the secure OS unit 22 is enabled. Even in the locked state, writing by the secure OS unit 22 is enabled. That is, even in the lockes state, the data instructed to be written by the secure OS unit 22 is enabled to be written into a region indicated by the physical address in the locked state.

The unlocked state is a state in which writing and reading by the secure OS unit 22 and the non-secure OS unit 24 are enabled. In other words, the unlocked state indicates a state in which the data instructed to be written by each of the secure OS unit 22 and the non-secure OS unit 24 is enabled to be written and read. That is, the unlocked state indicates a state in which writing restriction, into the physical memory 14, of the data instructed to be written by the non-secure OS unit 24 is released.

Thus, writing of the data instructed to be written by the non-secure OS unit 24 is restricted, the writing into a region at the physical address corresponding to the state information of "locked state" in the physical memory 14. On the other hand, the data instructed to be written by the secure OS unit 22 can be read and written from/into all physical addresses in the physical memory 14 irrespective of the state information.

The memory access control table 30 is updated by the monitor unit 26 and the secure OS unit 22.

Next, the following describes the non-secure OS unit 24. The non-secure OS unit 24 is an OS operating in the non-secure mode NS. In the present embodiment, the non-secure OS unit 24 passes processing content and processing target data to the secure OS unit 22 via the cache memory 18, and requests the secure OS unit 22 to process the data. The processing content is content of processing requested to be performed by the secure OS unit 22 from the non-secure OS unit 24. The processing target data is target data requested to be processed by the secure OS unit 22 from the non-secure OS unit 24.

The non-secure OS unit 24 includes a writing destination ring unit 24A, a first writing unit 24B, and a monitor calling unit 24C. That is, the writing destination setting unit 24A, the first writing unit 24B, and the monitor calling unit 24C operate in the non-secure mode NS.

The writing destination setting unit 24A sets the data size and the physical address of the physical memory 14 into which the processing content and the processing target data are written. The writing destination setting unit 24A shares the physical address (for example, a physical address 99X) of the shared physical region 14A in the table of correspondence 32 (see FIG. 4) with the secure OS unit 22 to set the physical address at which the processing content and the processing target data are written. The writing destination setting unit 24A sets, as the data size, a size totalizing the processing content and the processing target data. The processing content may include a size or a head physical address of the processing target data that is required for reading out the processing target data. The processing content may also include a number for distinguishing the processing content.

The first writing unit 24B writes the data into be cache memory 18. Specifically, the first writing unit 24B writes the processing target data into the shared cache region 18A of the cache memory 18. In the present embodiment, the first writing unit 24B writes the processing content and the processing target data into the shared cache region 18A.

Specifically, the first writing unit 24B notifies the cache control unit 28A of writing instruction and writing data of the processing target data to the physical memory 14. Specifically, the first writing unit 24B notifies the cache control unit 28A of the physical address 99X set by the writing destination setting unit 24A, a data size of the writing data, and the writing data. The writing data includes the processing target data and the processing content for the processing target data.

The cache control unit 28A then specifies a cache address corresponding to the physical address 99X included in the writing instruction received from the first writing unit 24B in the table of correspondence 32 (see FIG. 4). That is, the cache control unit 28A specifies a cache address of the shared cache region 18A. The cache control unit 28A writes the writing data and an attribute into a region indicated by the specified cache address in the shared cache region 18A by the size of the writing data.

The attribute indicates whether the data is data instructed to be written by the non-secure OS unit 24 or data instructed to be written by the secure OS unit 22. For example, the attribute indicates "NS" or "S". The attribute "NS" indicates that the data is instructed to be written by the non-secure OS unit 24. The attribute "S" indicates that the data is instructed to be written by the secure OS unit 22.

FIG. 7 is a schematic diagram illustrating an example of a state of the cache memory 18 and the physical memory 14 at the time when writing data 40 received from the first writing unit 24B is written. As illustrated in FIG. 7, the state is such that the writing data 40 received from the first writing unit 24B is written into the shared cache region 18A of the cache memory 18.

As described above, the writing data 40 includes processing target data 40A and processing content 40E. An attribute is given to the writing data 40. The processing target data 40A and the processing content 40E are data instructed to be written by the first writing unit 24B of the non-secure OS unit 24. Thus, the attribute given to the writing data 40 indicates "NS". The cache address indicating a writing destination of the writing data 40 corresponds to the start physical address 99X into which the processing target data 40A is written in the shared physical region 14A of the physical memory 14. At this point, the writing data 40 is not stored in the physical memory 14.

Returning to FIG. 3, the description will be continued. The monitor calling unit 24C notifies the monitor unit 26 of a first switching instruction for switching the mode from the non-secure mode NS to the secure mode S. At the time when the writing data 40 is written into the cache memory 18 by the first writing unit 24B, the monitor calling unit 24C notifies the monitor unit 26 of the first switching instruction from the non-secure mode NS to the secure mode S.

Next, the following describes the monitor unit 26. The monitor unit 26 includes a switching instruction handler unit 26X, a switching unit 26A, a timer handler unit 26B, a second writing unit 26C, a lock target region acquisition unit 26D, and a setting unit 26E.

When receiving a switching instruction, the switching instruction handler unit 26X sends a switching command to the switching unit 26A to switch the mode from the non-secure mode NS to the secure mode S, or from the secure mode S to the non-secure mode NS. The switching instruction is called a secure monitor call (SMC) in some cases. The switching instruction handler unit 26X receives the switching instruction from a read out unit 22B, the monitor calling unit 24C, or the setting unit 26E. In the present embodiment, the switching instruction handler unit 26X may receive the switching instruction during processing performed by the secure OS unit 22 or processing performed by the non-secure OS unit 24 (details will be described later).

When receiving the first switching instruction for switching the mode from the non-secure mode NS to the secure mode S, the switching instruction handler unit 26X sends a first switching command to the switching unit 26A for switching the mode from the non-secure mode NS to the secure mode S. The first switching instruction is an example of the switching instruction. The first switching command is an example of the switching command. The switching command is a command output from the switching instruction handler unit 26X to the switching unit 26A, and is a command for switching the mode from the non-secure mode NS to the secure mode S, or from the secure mode S to the non-secure mode NS.

When receiving a second switching instruction for switching the mode from the secure mode S to the non-secure mode NS, the switching instruction handler unit 26X sends a second switching command to the switching unit 26A for switching the mode from the secure mode S to the non-secure mode NS. The second switching instruction is an example of the switching instruction. The second switching command is an example of the switching command.

When receiving the first switching command for switching the mode from the non-secure mode NS to the secure mode S, the switching unit 26A switches the mode from the non-secure mode NS to the secure mode S. When receiving the second switching command for switching the mode from the secure mode S to the non-secure mode NS, the switching unit 26A switches the mode from the secure mode S to the non-secure mode NS.

As described above, the switching instruction handler unit 26X may receive the switching instruction during processing performed by the secure OS unit 22 and processing performed by the non-secure OS unit 24. Thus, the switching unit 26A may switch the mode from the secure mode S to the non-secure mode NS at the time when the information processing device 10 operates in the secure mode S.

The timer handler unit 26B, the second writing unit 26C, the lock target region acquisition unit 26D, and the setting unit 26E in the monitor unit 26 will be described later.

Next, the following describes the secure OS unit 22. The secure OS unit 22 is an OS operating in the secure mode S. In the present embodiment, the secure OS unit 22 receives the processing content 40E for the processing target data 40A that is written into the cache memory 18 by the non-secure OS unit 24 from the non-secure OS unit 24 via the cache memory 18. The secure OS unit 22 then processes the processing target data 40A that is written into the cache memory 18 by the non-secure OS unit 24 in accordance with the received processing content 40E, and notifies the non-secure OS unit 24 of a processing result via the cache memory 18. The secure OS unit 22 is not limited by a form of notifying the non-secure OS unit 24 of the processing result.

The secure OS unit 22 includes a read out destination acquisition unit 22A, a read out unit 22B, and a processing unit 22C. That is, the read out destination acquisition unit 22A, the read out unit 22B, and the processing unit 22C operate in the secure mode S.

When the mode is switched from the non-secure mode NS to the secure mode S by the switching unit 26A, the read out destination acquisition unit 22A acquires a read out destination of the writing data 40 (processing content 40E and processing target data 40A). The read out destination of the writing data 40 is information indicating an address for reading out the writing data 40. In the present embodiment, the read out destination acquisition unit 22A acquires, as the read out destination of the writing data 40, the physical address 99X of the shared physical region 14A that is shared with the non-secure OS unit 24.

The read out unit 22B reads out the writing data 40 in the cache memory 18. Specifically, the read out unit 22B reads out the processing target data 40A that is written into the shared cache region 18A of the cache memory 18 by the first writing unit 24B.

Specifically, the read out unit 22B notifies the cache control unit 28A of a read out instruction of the writing data 40 indicated by the physical address 99X acquired by the read out destination acquisition unit 22A.

The cache control unit 28A then specifies a cache address corresponding to the physical address 99X included in the read out instruction received from the read out unit 22B in the table of correspondence 32 (see FIG. 4). The cache control unit 28A outputs, to the read out unit 22B, the processing content 40E of the writing data 40 stored in the specified cache address in the cache memory 18.

The read out unit 22B notifies the processing unit 22C to perform processing indicated by the processing content 40E included in the writing data 40 on the processing target data 40A included in the writing data 40 read out from the cache memory 18.

The processing unit 22C reads out and processes the processing target data 40A in accordance with the processing content 40E received from the read out unit 22B. The read out unit 22B writes processed data processed by the processing unit 22C into the cache memory 18 as a processing result via the cache control unit 28A.

FIG. 8 is a schematic diagram illustrating an example of a state of the cache memory 18 and the physical memory 14 at the time when the processing performed by the processing unit 22C is ended. As illustrated in FIG. 8, the writing data 40 received from the first writing unit 24B is written into the shared cache region 18A of the cache memory 18. The state becomes such that a processing result 42 is written into a region other than the shared cache region 18A of the cache memory 18. The processing result 42 may be written into the shared cache region 18A.

The processing result 42 includes, for example, processed data 42A and a completion flag 42X, and an attribute is given to be processing result 42 by the cache control unit 28A. The processed data 42A is data obtained by processing the processing target data 40A in accordance with the processing content 40E. The processed data 42A is data written by the read out unit 22B of the secure OS unit 22, so that the attribute thereof indicates "S". The completion flag 42X indicates whether the processing is completed.

The read out unit 22B is not limited by a form of writing the processing result 42 into the cache memory 18. The read out unit 22B may notify another functional part arranged in the information processing device 10 of the processing result 42 in accordance with the processing content 40E.

Returning to FIG. 3, the description will be continued. Next, the following describes the timer handler unit 26B, the second writing unit 26C, the lock target region acquisition unit 26D, and the setting unit 26E in the monitor unit 26.

The timer handler unit 26B receives an interrupt signal from the timer 16. In the present embodiment, the timer 16 notifies the timer handler unit 26B of the interrupt signal every predetermined time. In the present embodiment, the notification of the interrupt signal is used as one of predetermined conditions for performing data movement (writing) from the cache memory 18 to the physical memory 14 in the write-back cache system. In a case in which a certain time has elapsed after cache access, the timer handler unit 26B may perform data movement (writing) from the cache memory 18 to the physical memory 14 in the write-back cache system.

When receiving the interrupt signal, the timer handler unit 26B outputs a signal indicating interrupt generation to the second writing unit 26C.

The second writing unit 26C writes, into the physical memory 14, at least part of the processing target data 40A among pieces of cache data stored in the cache memory 18. The cache data indicates data stored in the cache memory 18 having an attribute other than the above attributes.

For example, the second writing unit 26C writes, into the physical memory 14, the processing content 40E and the processing target data 40A (that is, the writing data 40) in the cache memory 18. Specifically, the second writing unit 26C writes, into the physical memory 14, the processing content 40E and the processing target data 40A in all pieces of cache data stored in the cache memory 18.

In the present embodiment, described is a form of the second writing unit 26C that writes all pieces of cache data in the cache memory 18 into the physical memory 14. Specifically, the second writing unit 26C writes all pieces of cache data in the cache memory 18 into the physical memory 14 via the cache control unit 28A and the memory access control unit 28B. Writing from the cache memory 18 into the physical memory 14 performed by the second writing unit 26C means to "move" the data in the cache memory 18 to the physical memory 14.

As described above, the data stored in a region indicated by each cache address in the cache memory 18 is written into each region indicated by the corresponding physical address described in the table of correspondence 32 (see FIG. 4) in the physical memory 14. Thus, the cache data in the shared cache region 18A of the cache memory 18 is written into the shared physical region 14A of the physical memory 14.

Writing from the cache memory 18 to the physical memory 14 may be automatically performed by the cache control unit 28A after a certain time has elapsed after the cache memory 18 is accessed.

FIG. 9 is a schematic diagram illustrating an example of a state of the cache memory 18 and the physical memory 14 at the time when the writing performed by the second writing unit 26C is ended. Due to the writing performed by the second writing unit 26C, all pieces of cache data in the cache memory 18 are written into the region indicated by the corresponding physical address in the physical memory 14. As described above, the cache data according to the present embodiment does not include the attribute described above. Thus, due to the writing performed by the second writing unit 26C, the writing data 40 (the processing content 40E, the processing target data 40A) and the processing result 42 (the processed data 42A, the completion flag 42X) in the cache memory 18 are written into the region indicated by the corresponding physical address in the physical memory 14.

Thus, the writing data 40 that has been written into the shared cache region 18A in the cache memory 18 is written into the shared physical region 14A of the physical memory 14, and the processing result 42 that has been written into the region other than the shared cache region 18A of the cache memory 18 is written into a region other than the shared physical region 14A of the physical memory 14. The other pieces of cache data in the cache memory 18 are also written into the region indicated by the corresponding physical address in the physical memory 14.

Returning to FIG. 3, the description will be continued. The lock target region acquisition unit 26D acquires the shared physical region 14A of the physical memory 14 as a lock target region. The lock target region acquisition unit 26D acquires the lock target region by reading the physical address indicating the shared physical region 14A in the table of correspondence 32 (see FIG. 4). For example, the lock target region acquisition unit 26D acquires the entire shared physical region 14A as the lock target region.

The lock target region acquisition unit 26D may acquire, as the lock target region, at least part of a region in the physical memory 14. For example, the lock target region acquisition unit 26D may acquire, as the lock target region, at least a region into which the data is written by the second writing unit 26C in the shared physical region 14A corresponding to the shared cache region 18A in the physical memory 14. In the present embodiment, exemplified is a case in which the lock target region acquisition unit 26D acquires, as the lock target region, the shared physical region 14A corresponding to the shared cache region 18A in the physical memory 14.

The setting unit 26E sets, to be in a locked state, at least part of the region in the physical memory 14 at the time when the mode of the information processing device 10 is the secure mode S and before the mode is switched from the secure mode S to the non-secure mode NS.

In the present embodiment, the setting unit 26E sets, to be in the locked state, at least a region into which the data is written by the second writing unit 26C in the shared physical region 14A corresponding to the shared cache region 18A in the physical memory 14 before the mode is switched from the secure mode S to the non-secure mode NS. In the present embodiment, the setting unit 26E sets, to be in the locked state, the shared physical region 14A as the lock target region acquired by the lock target region acquisition unit 26D.

For example, the setting unit 26E notifies the memory access control unit 28B of a lock instruction indicating to cause the shared physical region 14A to be in the locked state. The memory access control unit 28B updates, to "locked state", the state information corresponding to the physical address indicating the shared physical region 14A included in the lock instruction in the memory access control table 30. Through this processing, before the mode is switched from the secure mode S to the non-secure mode NS, the entire shared physical region 14A is set to be in the locked state. In the following description, the state may be referred to as a locked state L.

FIG. 10 is a schematic diagram illustrating an example of a state of the cache memory 18 and the physical memory 14 at the time when the locked state is set by the setting unit 26E. As illustrated in FIG. 10, through the processing performed by the setting unit 26E, the shared physical region 14A is set to be in the locked state L. Thus, the shared physical region 14A in the physical memory 14 is caused to be in a state in which the data of attribute "NS" instructed to be written by the non-secure OS unit 24 is not enabled to be written into the physical memory 14 front the cache memory 18. In other words, the shared physical region 14A set to be in the locked state L is caused to be in a state in which writing or rewriting performed by the non-secure OS unit 24 is limited.

That is, in the present embodiment, after the second writing unit 26C writes all pieces of cache data in the cache memory 18 into the physical memory 14, the setting unit 26E sets, to be in the locked state L, all regions in the shared physical region 14A including the processing target data 40A in the physical memory 14.

Thus, before the shared physical region 14A is set to be in the locked state L by the setting unit 26E, the second writing unit 26C writes, into the shared physical region 14A of the physical memory 14, at least part of the processing target data 40A among the pieces of cache data stored in the cache memory 18. After at least part of the processing target data 40A is written into the shared physical region 14A, the setting unit 26E sets the region into which the data is written in the physical memory 14 to be in the locked state L. The processing is performed before the mode is switched from the secure mode S to the non-secure mode NS.

After setting the shared physical region 14A to be in the locked state L, the setting unit 26E notifies the switching instruction handler unit 26X of the second switching instruction for switching the mode from the secure mode S to the non-secure mode NS. Thus, the switching instruction handler unit 26X notifies the switching unit 26A of the second switching command. When receiving the second switching command, the switching unit 26A switches the mode from the secure mode S to the non-secure mode NS. Thus, the non-secure OS unit 24 is enabled, and the non-secure OS unit 24 is caused to be in a state of being able to read the processing result 42 and the writing data 40. However, writing or rewriting of the data into the shared physical region 14A performed by the non-secure OS unit 24 is limited.

As described above, when the timer handler unit 26B receives interrupt signal from the timer 16, the second writing unit 26C writes, into the physical memory 14, at least part of the processing target data 40A stored in the cache memory 18, and the setting unit 26E sets, to be in the locked state L, at least the region into which the data is written by the second writing unit 26C in the physical memory 14. Thus, before the physical memory 14 is set to be in the locked state L by the setting unit 26E, the second writing unit 26C writes the data into the physical memory 14 from the cache memory 18. When the above region in the physical memory 14 is set to be in the locked state L, the setting unit 26E notifies the switching instruction handler unit 26X of the second switching instruction, and the switching instruction handler unit 26X notifies the switching unit 26A of the second switching command. The switching unit 26A then switches the mode from the secure mode S to the non-secure mode NS.

Thus, in the information processing device 10 according to the present embodiment, even in a case in which a reception timing of the interrupt signal by the timer 16 is during processing of the processing target data 40A in the cache memory 18 by the secure OS unit 22, the switching unit 26A can switch the mode from the secure mode S to the non-secure mode NS. In other words, even when the information processing device 10 is operating in the secure mode S, the switching unit 26A can switch the mode from the secure mode S to the non-secure mode NS.

Figure 11:
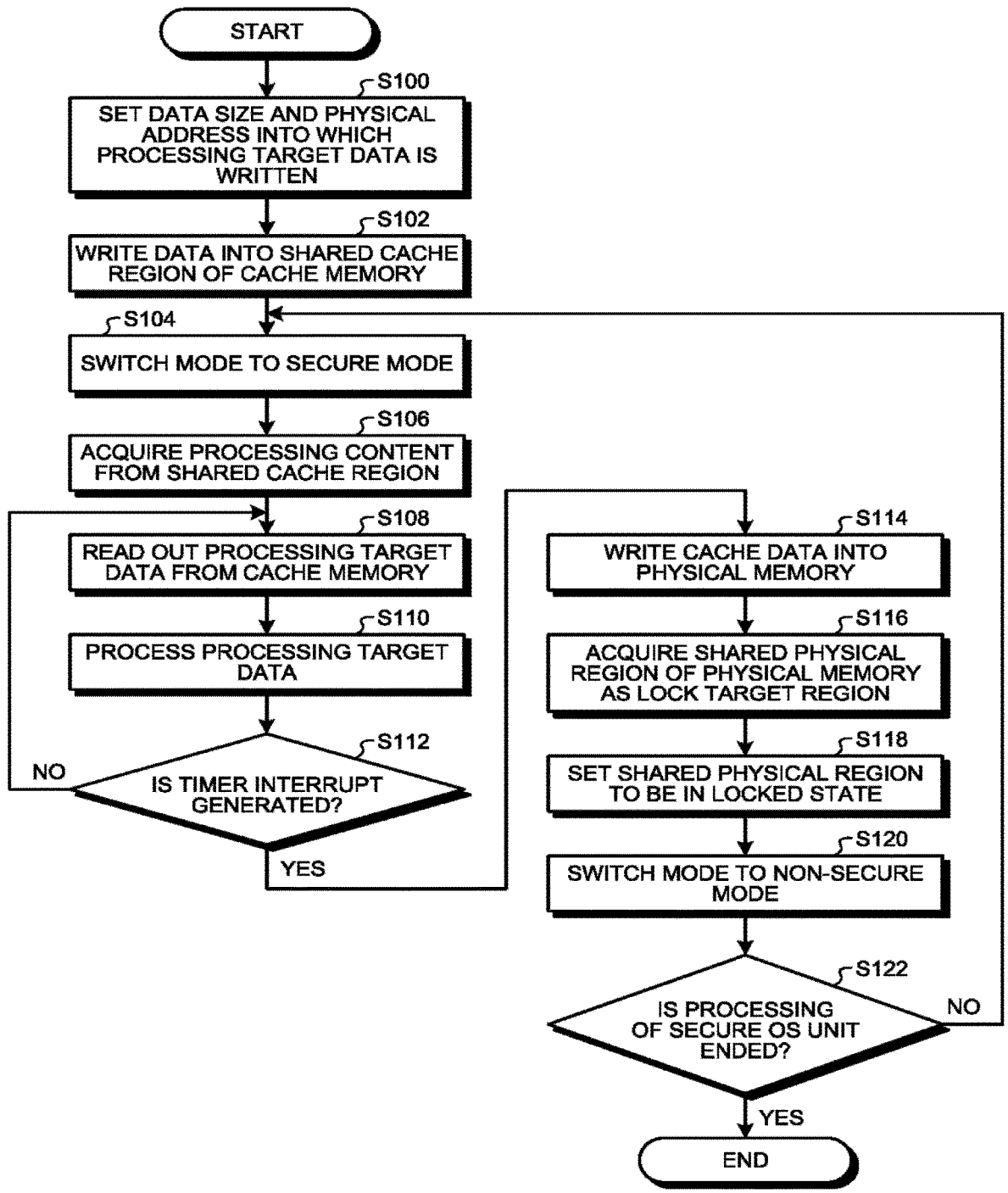
FIG. 11 is a flowchart of an information processing procedure.

Next, the following describes a procedure of information processing performed by the information processing device 10 according to the present embodiment. FIG. 11 is a flowchart illustrating an example of the procedure of the information processing performed by the information processing device 10 according to the present embodiment.

First, the writing destination setting unit 24A of the non-secure OS unit 24 sets the data size and the physical address 99X of the physical memory 14 (Step S100). Next, the first writing unit 24B writes the writing data 40 (the processing content 40E and the processing target data 40A) into the shared cache region 18A (Step S102).

At Step S102, the first writing unit 24B notifies the cache control unit 28A of each of the writing instruction including the physical address 99X and the data size set at Step S100, and the writing data 40 including the processing target data 40A and the processing content 40E. The cache control unit 28A writes the writing data 40 into the region indicated by the cache address corresponding to the physical address 99X included in the received writing instruction in the cache memory 18 by the data size included in the writing instruction. At this point, the cache control unit 28A gives an attribute indicating "NS" to the writing data 40. Through the processing at Step S102, the state becomes such that the writing data 40 is written into the shared cache region 18A of the cache memory 18 (see FIG. 7).

Next, the switching unit 26A switches the mode from the non-secure mode NS to the secure mode S (Step S104). When the processing at Step S102 is ended, the monitor calling unit 24C notifies the switching instruction handler unit 26X of first switching instruction. The switching instruction handler unit 26X sends the first switching command to the switching unit 26A. When receiving the first switching command, the switching unit 26A switches the mode from the non-secure mode NS to the secure mode S.

Next, the read out destination acquisition unit 22A of the secure OS unit 22 acquires the processing content 40E included in the writing data 40 written into the physical address 99X of the shared physical region 14A and the shared cache region 18A of the cache memory 18 (Step S106).

Next, the read out unit 22B reads out the processing target data 40A in the cache memory 18 based on the processing content 40E (Step S108). At Step S108, the read out unit 22B notifies the cache control unit 28A of the read out instruction for the processing target data 40A indicated by the processing content. The cache control unit 28A outputs, to the read out unit 22B, the processing target data 40A stored at the cache address corresponding to the head physical address of the processing target data 40A included in the processing content 40E in the cache memory 18. Through this processing, the read cut unit 22B reads out the processing target data 40A included in the writing data 40.

The processing unit 22C performs processing indicated by the processing content 40E included in the writing data 40 on the processing target data 40A read out at Step S108 (Step S110) (see FIG. 8).

Next, it is determined whether the timer 16 has caused an interrupt to be generated (Step S112). If time counting reaches a certain number of counts, the timer 16 causes an interrupt to be generated. At Step S112, it is determined whether the timer 16 has caused the interrupt signal to be generated due to the fact that a certain number of time counts is reached and thus a determination at Step S112 is made.

If a negative determination is made at Step S112 (No at Step S112), the process returns to Step S108. If a positive determination is made at Step S112 (Yes at Step S112), the process proceeds to Step S114.

At Step S114, the timer handler unit 26B is called because the interrupt is generated. The timer handler unit 26B causes the second writing unit 26C to execute. The second writing unit 26C instructs the cache control unit 28A to write all pieces of cache data in the cache memory 18 into the physical memory 14 (Step S114). Thus, the state becomes such that all pieces of cache data in the cache memory 18 are written into the physical memory 14, and all pieces of cache data in the shared cache region 18A of the cache memory 18 are written into the shared physical region 14A of the physical memory 14 (see FIG. 9).

Next, the lock target region acquisition unit 26D acquires the shared physical region 14A of the physical memory 14 as the lock target region (Step S116). The setting unit 26E then sets, to be in the locked state L, the shared physical region 14A of the physical memory 14 acquired at Step S116 as the lock target region (Step S118).

Through the processing at Step S118, the shared physical region 14A of the physical memory 14 is caused to be in the locked state L (see FIG. 10). The processing target data 40A is written into the shared physical region 14A, so that the processing target data 40A included in the shared physical region 14A is also caused to be in the locked state L.

Next, the switching unit 26A switches the mode from the secure mode S to the non-secure mode NS (Step 120). Through the processing at Step S120, the non-secure OS unit 24 is enabled.

Next, the monitor calling unit 24C refers to the completion flag 42X included in the processing result 42, and determines whether processing of the processing target data 40A based on the processing content 40E at Step S110 performed by the secure OS unit 22 is ended (Step S122). If a negative determination is made at Step S122 (No at Step S122), the process returns to Step S104. On the other hand, if a positive determination is made at Step S122 (Yes at Step S122), this routine is ended.

As described above, the information processing device 10 according to the present embodiment operates while switching between the secure mode S and the non-secure mode NS. When operating in the secure mode S, the switching unit 26A of the information processing device 10 switches the mode from the secure mode S to the non-secure mode NS.

In this way, in the information processing device 10 according to the present embodiment, the switching unit 26A switches the mode from the secure mode S to the non-secure mode NS while the information processing device 10 is operating in the secure mode S without waiting until the processing in the secure mode S is ended.

Accordingly, with the information processing device 10 according to the present embodiment, real-time performance can be improved.

The information processing device 10 according to the present embodiment also includes the setting unit 26E. Before the mode is switched from the secure mode S to the non-secure mode NS, the setting unit 26E sets, to be in the locked state L, at least part of the region in the physical memory 14 shared by the secure mode S and the non-secure mode NS.

Thus, with the information processing device 10 according to the present embodiment, a risk of vulnerability incorporation can be reduced in addition to the effect described above.

In the information processing device 10 according to the present embodiment, the read out unit 22B operating in the secure mode S reads out the processing target data that is written into the shared cache region 18A of the cache memory 18 by the first writing unit 24B. Before the state is set to be the locked state L by the setting unit 26E, the second writing unit 26C writes, into the physical memory 14, at least part of the processing target data among the pieces of cache data stored in the cache memory 18.

In the information processing device 10 according to the present embodiment, the setting unit 26E sets, to be in the locked state L, at least the region into which the data is written by the second writing unit 26C in the shared physical region 14A corresponding to the shared cache region 18A in the physical memory 14.

Thus, with the information processing device 10 according to the present embodiment, a risk of vulnerability incorporation can be reduced and an error can be prevented from occurring at the time of memory access in addition to the effect described above.

Figure 12:
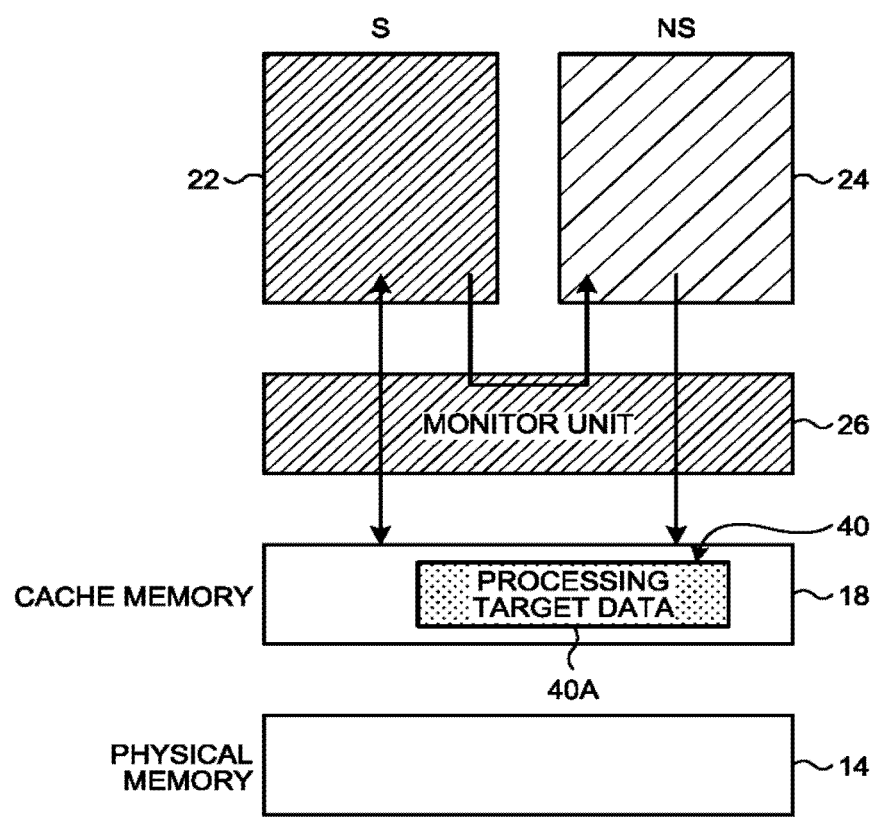
FIG. 12 is an explanatory diagram of an effect.
Figure 13:
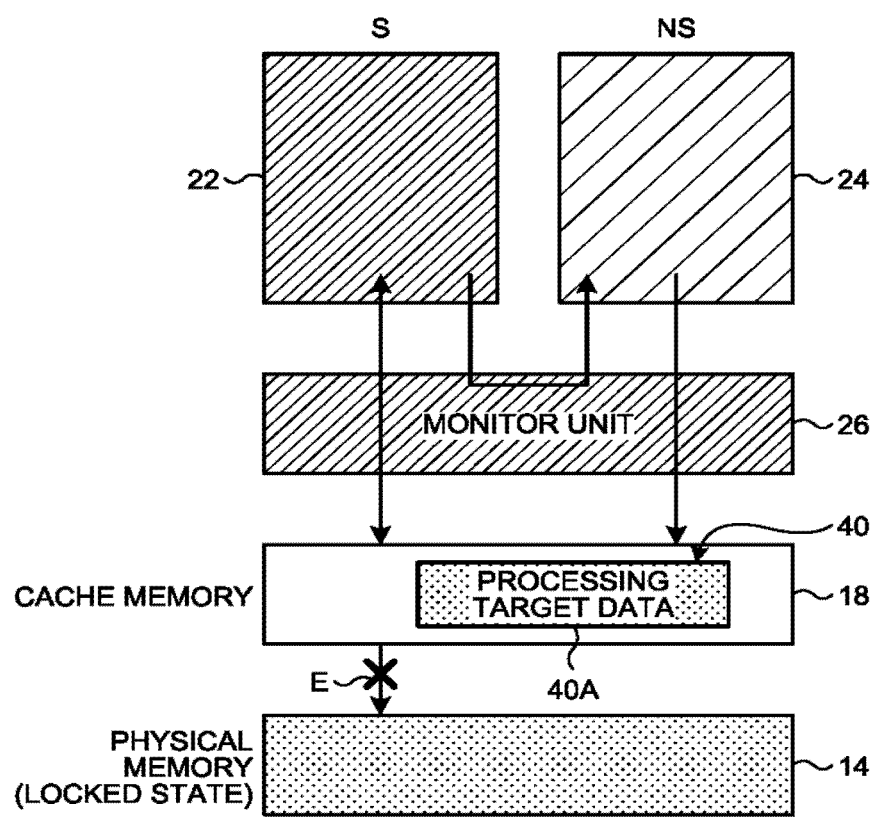
FIG. 13 is an explanatory diagram of an effect.
Figure 14:
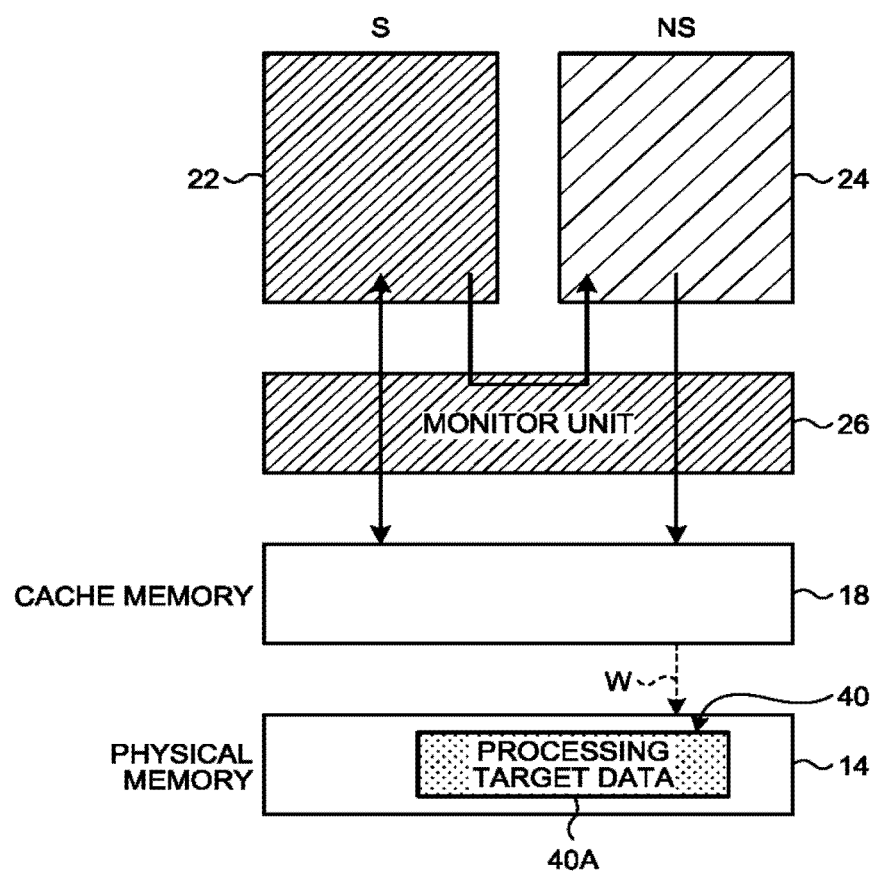
FIG. 14 is an explanatory diagram of an effect.

The following describes a reason that real-time performance can be improved, a risk of vulnerability incorporation can be reduced, and an error can be prevented from occurring at the time of memory access. FIG. 12 to FIG. 14 are explanatory diagrams of these effects.

As illustrated in FIG. 12, it is assumed that the writing data 40 is passed from the non-secure OS unit 24 to the secure OS unit 22 via the cache memory 18, and the secure OS unit 22 is requested to process the processing target data 40A included in the writing data 40.

While the secure OS unit 22 is processing the processing target data 40A, the monitor unit 26 switches the mode from the secure mode S to the non-secure mode NS. The setting unit 26E is assumed to set the physical memory 14 to be in the locked state L (see FIG. 13). Writing of the processing target data 40A of attribute "NS" into the physical memory 14 is then limited. Thus, when the cache control unit 28A automatically writes the cache data in the cache memory 18 into the physical memory 14, an access error with respect to the physical memory 14 may be caused (see an error E in FIG. 13).

On the other hand, in a case of writing the cache data in the cache memory 18 into the physical memory 14 (writing W, see FIG. 14) without causing the physical memory 14 to be in the locked state L to prevent such an access error, writing performed by the non-secure OS unit 24 is not limited, and a risk of vulnerability incorporation may be caused.

Thus, the second writing unit 26C writes, into the physical memory 14, at least part of the processing target data 40A among the pieces of cache data stored in the cache memory 18. The setting unit 26E sets, to be in the locked state L, at least a region into which the data is written by the second writing unit 26C in the shared physical region 14A corresponding to the shared cache region 18A in the physical memory 14 (see FIG. 9 and FIG. 10).

The non-secure OS unit 24 is then prevented from falsifying at least the region into which the data is written by the second writing unit 26C in the shared physical region 14A including the processing target data 40A, and a risk of vulnerability incorporation can be reduced. The cache data in the cache memory 18 is written into the physical memory 14 before setting, to be in the locked state L, at least the region into which the data is written by the second writing unit 26C in the shared physical region 14A, so that an access error can be prevented from being caused at the time when the processing target data 40A of attribute "NS" is written into the physical memory 14.

Thus, with the information processing device 10 according to the present embodiment, a risk of vulnerability incorporation can be reduced, and an error can be prevented from being caused at the time of memory access in addition to the effect such as improvement in real-time performance.

In the information processing device 10 according to the present embodiment, the configuration described above can prevent an error from being caused at the time of memory access. Thus, in the information processing device 10, it is not necessary to perform processing of releasing the access error, the processing of releasing the access error by switching the mode from the secure mode S to the non-secure mode NS again after switching the mode from the non-secure mode NS to the secure mode S and releasing the locked state L. Thus, the processing performed by the non-secure OS unit 24 can be prevented from being stopped at the time of writing the data into the physical memory 14 by the non-secure OS unit 24 via the cache memory 18. Thus, the information processing device 10 according to the present embodiment can prevent deterioration in the processing performed by the non-secure OS unit 24 in addition to the above effect.

First Modification

In the first embodiment, described is a case in which the monitor unit 26 includes the switching unit 26A, the timer handler unit 26B, the second writing unit 26C, the lock target region acquisition unit 26D, and the setting unit 26E (see FIG. 3). However, at least one of the timer handler unit 26B, the second writing unit 26C, the lock target region acquisition unit 26D, and the setting unit 26E may be arranged in the secure OS unit 22.

Figure 15:
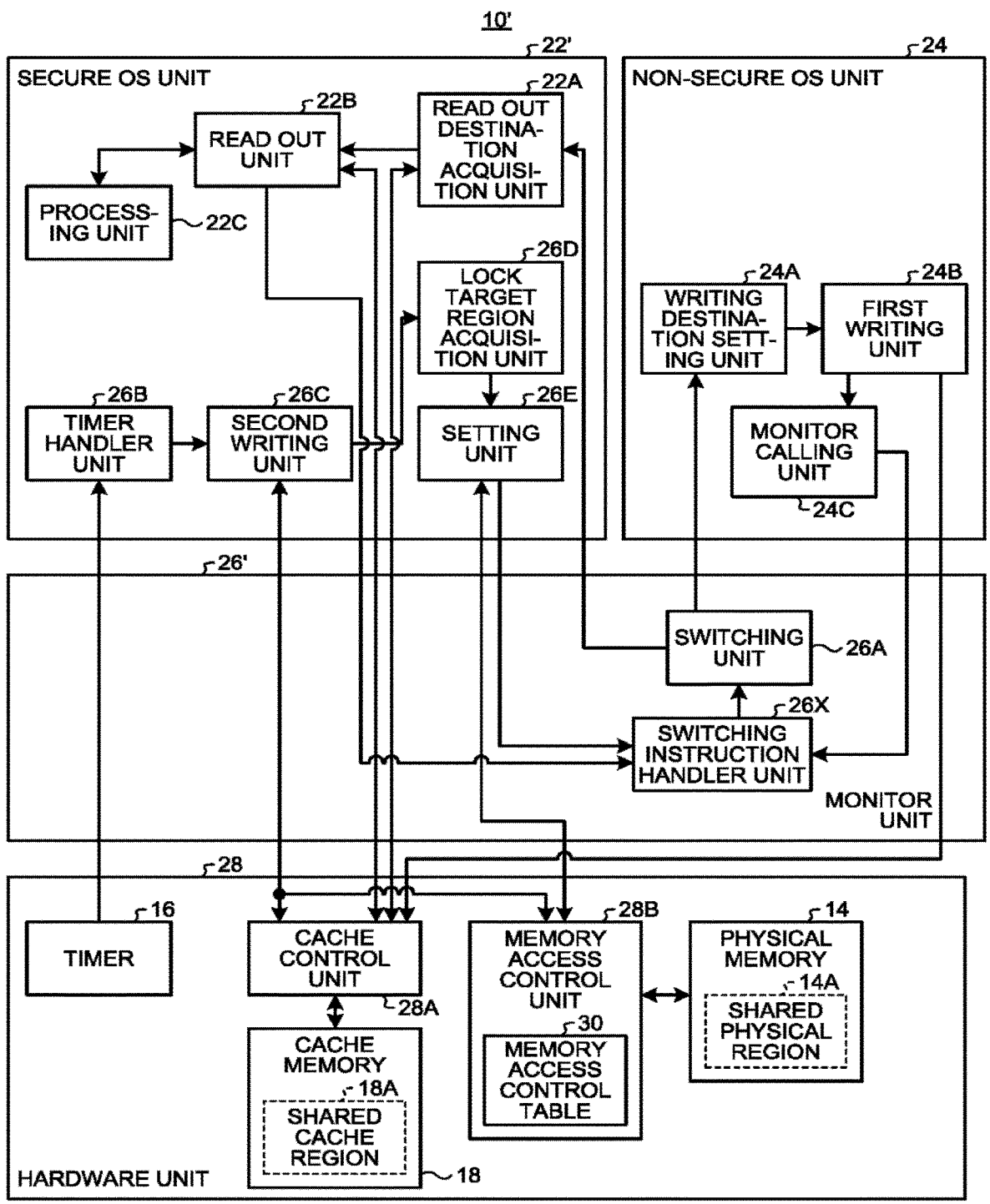
FIG. 15 is a schematic diagram of the information processing device according to a first modification.

FIG. 15 is a schematic diagram illustrating an example of an information processing device 10' according to a first modification. An outline of a hardware configuration and a functional configuration is similar to that of the information processing device 10 according to the first embodiment (see FIG. 2 and FIG. 3).

The information processing device 10' includes a secure OS unit 22', the non-secure OS unit 24, a monitor unit 26', and a hardware unit 28. The non-secure OS unit 24 and the hardware unit 28 are the same as those in the information processing device 10. The secure OS unit 22' and the monitor unit 26' are the same as those in the information processing device 10 according to the first embodiment except that the timer handler unit 26B, the second writing unit 26C, the lock target region acquisition unit 26D, and the setting unit 26E are arranged in the secure OS unit 22'. The timer handler unit 26B, the second writing unit 26C, the lock target region acquisition unit 26D, and the setting unit 26E are the same as those in the first embodiment.

In this way, at least one of the timer handler unit 26B, the second writing unit 26C, the lock target region acquisition unit 26D, and the setting unit 26E may be arranged in the secure OS unit 22. The second writing unit 26C may be arranged in the non-secure OS unit 24.

Second Embodiment

In the first embodiment, described is a form in which the second writing unit 26C writes all the pieces of cache data in the cache memory 18 into the physical memory 14, and the setting unit 26E sets the shared physical region 14A of the physical memory 14 to be in the locked state L.

In the present embodiment, the following describes a form of writing the cache data in the shared cache region 18A of the cache memory 18 into the physical memory 14, and setting the shared physical region 14A of the physical memory 14 to be in the locked state L.

Figure 16:
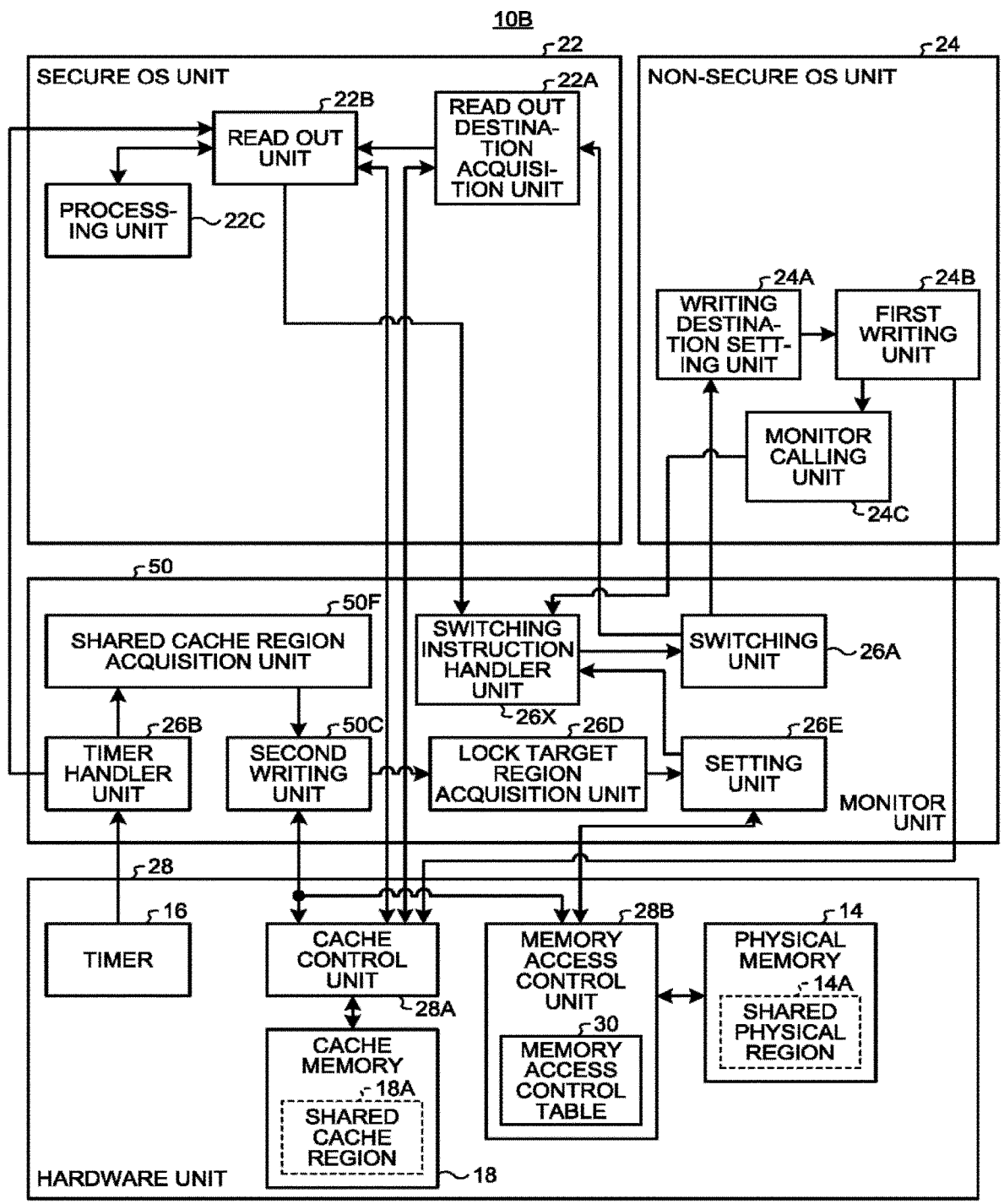
FIG. 16 is a diagram of a functional configuration of the information processing device according to a second embodiment.

FIG. 16 is a diagram illustrating an example of a functional configuration of an information processing device 10B according to a second embodiment.

The information processing device 10B includes the secure OS unit 22, the non-secure OS unit 24, a monitor unit 50, and the hardware unit 28. The information processing device 10B is the same as the information processing device 10 according to the first embodiment except that the monitor unit 50 is arranged in place of the monitor unit 26.

The monitor unit 50 includes the switching unit 26A, the timer handler unit 26B, the lock target region acquisition unit 26D, the setting unit 26E, the switching instruction handler unit 26X, a second writing unit 50C, and a shared cache region acquisition unit 50F. The switching unit 26A, the timer handler unit 26B, the lock target region acquisition unit 26D, and the setting unit 26E are the same as those in the first embodiment.

The shared cache region acquisition unit 50F acquires a cache address of the shared cache region 18A in the cache memory 18. The shared cache region acquisition unit 50F acquires the cache address of the shared cache region 18A by reading the cache address of the shared cache region 18A in the table of correspondence 32 (see FIG. 4).

The second writing unit 50C writes the cache data in the shared cache region 18A in the cache memory 18 into the shared physical region 14A of the physical memory 14.

Specifically, the second writing unit 50C receives the cache address of the shared cache region 18A from the shared cache region acquisition unit 50F. The second writing unit 50C then writes all the pieces of cache data in the shared cache region 18A into the physical memory 14 via the cache control unit 28A and the memory access control unit 28B. Thus, all the pieces of cache data in the shared cache region 18A are moved to the shared physical region 14A of the physical memory 14.

Figure 17:
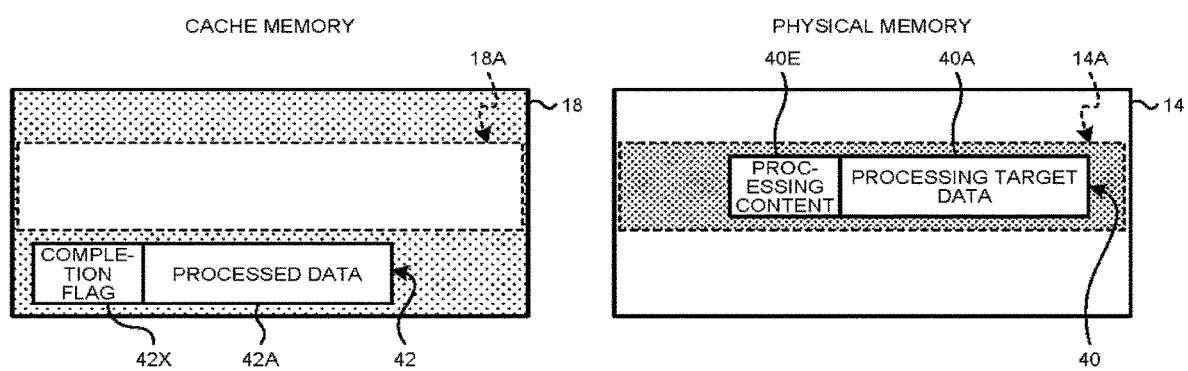
FIG. 17 is a schematic diagram of the cache memory and the physical memory.

FIG. 17 is a schematic diagram illustrating an example of a state of the cache memory 18 and the physical memory 14 at the time when the writing performed by the second writing unit 50C is ended. Through the writing performed by the second writing unit 50C, all the pieces of cache data in the shared cache region 18A of the cache memory 18 are written into the shared physical region 14A of the physical memory 14.

Thus, in the present embodiment, the cache data that has been written in a region other than the shared cache region 18A of the cache memory 18 (for example, the processing result 42) is left in the cache memory 18, and is not written into the physical memory 14.

Returning to FIG. 16, the description will be continued. Similarly to the first embodiment, the lock target region acquisition unit 26D acquires the shared physical region 14A of the physical memory 14 as the lock target region. Similarly to the first embodiment, the setting unit 26E sets, to be in the locked state, the shared physical region 14A corresponding to the shared cache region 18A in the physical memory 14.

Figure 18:
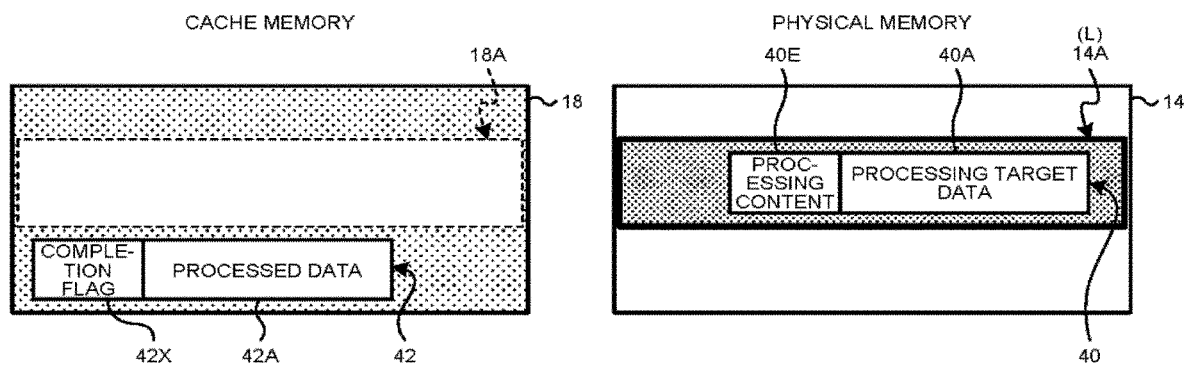
FIG. 18 is a schematic diagram cache memory and the physical memory.

FIG. 18 is a schematic diagram illustrating an example of the state of the cache memory 18 and the physical memory 14 at the time when the locked state is set by the setting unit 26E. As illustrated in FIG. 18, through the processing performed by the setting unit 26E, the shared physical region 14A is set to be in the locked state L.

In this way, in the present embodiment, the second writing unit 50C writes, into the physical memory 14, the cache data in the shared cache region 18A of the cache memory 18. The setting unit 26E then sets all regions in the shared physical region 14A to be in the locked state L. Thus, the processing target data 40A stored in the shared cache region 18A is written into the shared physical region 14A of the physical memory 14, and the shared physical region 14A including the processing target data 40A is set to be in the locked state L.

Figure 19:
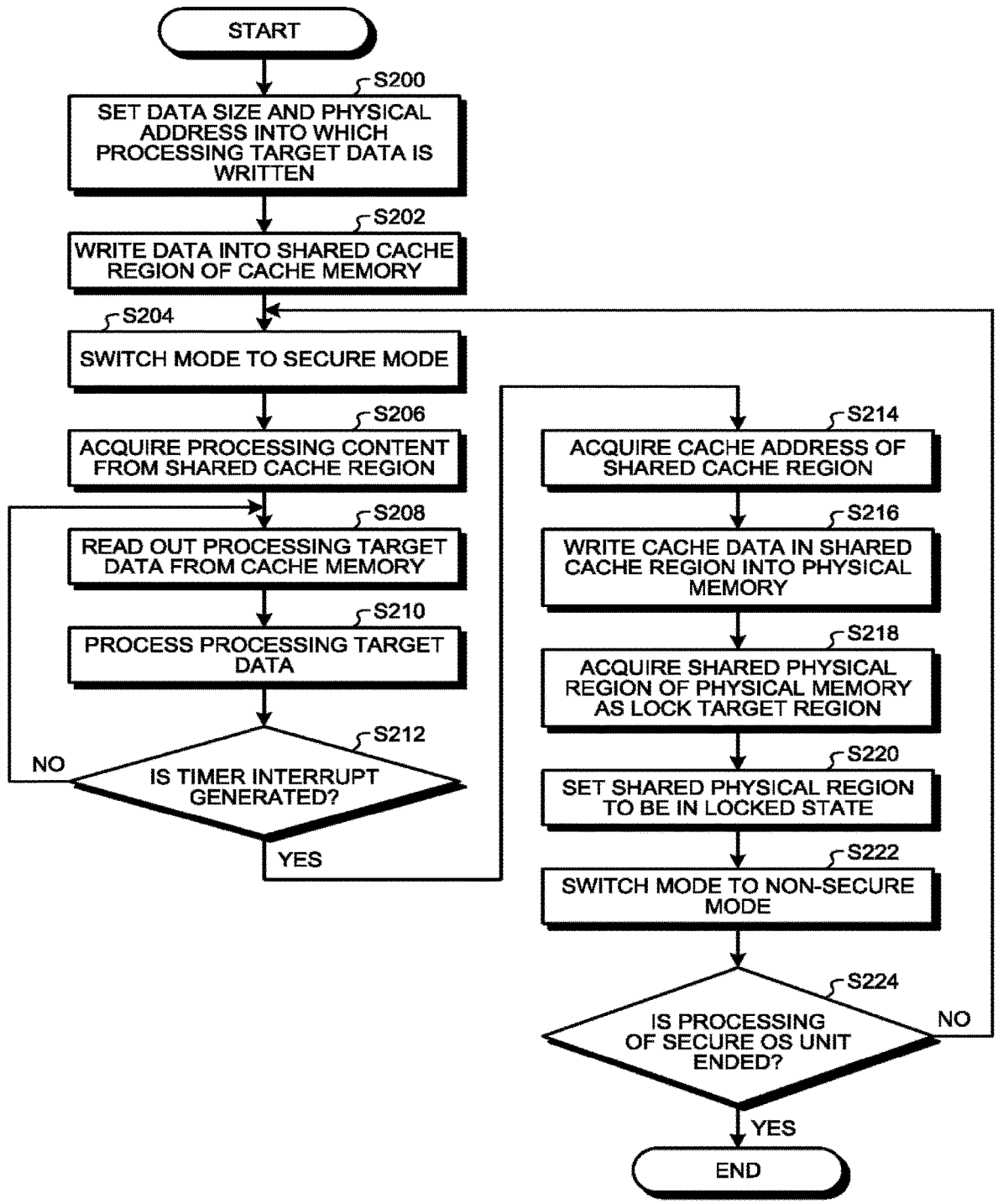
FIG. 19 is a flowchart of an information processing procedure.

Next, the following describes a procedure of information processing performed by the information processing device 10B according to the present embodiment. FIG. 19 is a flowchart illustrating an example of the procedure of information processing performed by the information processing device 10B according to the present embodiment.

The information processing device 10B performs processing at Step S200 to Step S212 similarly to the procedure of the information processing device 10 (Step S100 to Step S112, see FIG. 11).

Specifically, in the information processing device 10B, the writing destination setting unit 24A of the non-secure OS unit 24 sets the data size and the physical address of the physical memory 14 (Step S200). Next, the first writing unit 24B writes the processing target data 40A into the shared cache region 18A (Step S202). Next, the switching unit 26A switches the mode from the non-secure mode NS to the secure mode S (Step S204).

Next, the read out destination acquisition unit 22A of the secure OS unit 22 acquires the processing content 40E included in the writing data 40 written into the physical address 99X of the shared physical region 14A and the shared cache region 18A of the cache memory 18 (Step S206). Next, the read out unit 22B reads out the processing target data 40A in the cache memory 18 based on the processing content 40E (Step S208). The processing unit 22C performs processing indicated by the processing content 40E included in the writing data 40 on the processing target data 40A read out at Step S208 (Step S210).

Next, it is determined whether the timer 16 has caused an interrupt to be generated (Step 212). If a negative determination is made at Step S212 (No at Step S212), the process returns to Step S208. If a positive determination is made at Step S212 (Yes at Step S212), the process proceeds to Step S214.

Next, the shared cache region acquisition unit 50F acquires the cache address of the shared cache region 18A in the cache memory 18 (Step S214). Next, the second writing unit 50C instructs the cache control unit 28A to write the cache data in the shared cache region 18A in the cache memory 18 into the shared physical region 14A of the physical memory 14 (Step S216, see FIG. 17).

Next, the lock target region acquisition unit 26D acquires the shared physical region 14A of the physical memory 14 as the lock target region (Step S218). The setting unit 26E sets, to be in the locked state L, the shared physical region 14A of the physical memory 14 acquired as the lock target region at Step S218 (Step S220) (see FIG. 18).

Next, the switching unit 26A switches the mode from the secure mode S to the non-secure mode NS (Step S222). Next, the monitor calling unit 24C refers to the completion flag 42X included in the processing result 42 to determine whether the processing of the processing target data 40A at Step S210 performed by the secure OS unit 22 is ended (Step S224). If a negative determination is made at Step S224 (No at Step S224), the process returns to Step S204. On the other hand, if a positive determination is made at Step S224 (Yes at Step S224), this routine is ended.

As described above, in the information processing device 10B according to the present embodiment, the second writing unit 50C writes cache data in the shared cache region 18A into the physical memory 14. The setting unit 26E then sets all regions in the shared physical region 14A to be in the locked state L. Thus, the processing target data 40A stored in the shared cache region 18A is written into the shared physical region 14A of the physical memory 14, and the shared physical region 14A including the processing target data 40A is set to be in the locked state L.

Thus, with the information processing device 10B according to the present embodiment, the non-secure OS unit 24 can be prevented from falsifying the shared physical region 14A including the processing target data 40A, and a risk of vulnerability incorporation can be reduced. The cache data in the shared cache region 18A is written into the physical memory 14 before the shared physical region 14A is set to be in the locked state L, so that an access error can be prevented from being caused at the time when the processing target data 40A of attribute "NS" is written into the physical memory 14.

Accordingly, with the information processing device 10B according to the present embodiment, real-time performance can be improved, a risk of vulnerability incorporation can be reduced, and an error can be prevented from being caused at the time of memory access.

In the information processing device 10B according to the present embodiment, the second writing unit 50C writes the cache data in the shared cache region 18A into the physical memory 14. Herein, the shared cache region 18A in the cache memory 18 is a fixed region set in advance. Due to this, the information processing device 10B according to the present embodiment can easily write the cache data into the physical memory 14 from the cache memory 18 in addition to the effect of the first embodiment.

Second Modification

In the second embodiment, described is a case in which the monitor unit 50 includes the switching unit 26A, the timer handler unit 26B, the shared cache region acquisition unit 50F, the second writing unit 50C, the lock target region acquisition unit 26D, the setting unit 26E, and the switching instruction handler unit 26X (see FIG. 16). However, at least one of the timer handler unit 26B, the shared cache region acquisition unit 50F, the second writing unit 50C, the lock target region acquisition unit 26D, and the setting unit 26E may be arranged in the secure OS unit 22.

Figure 20:
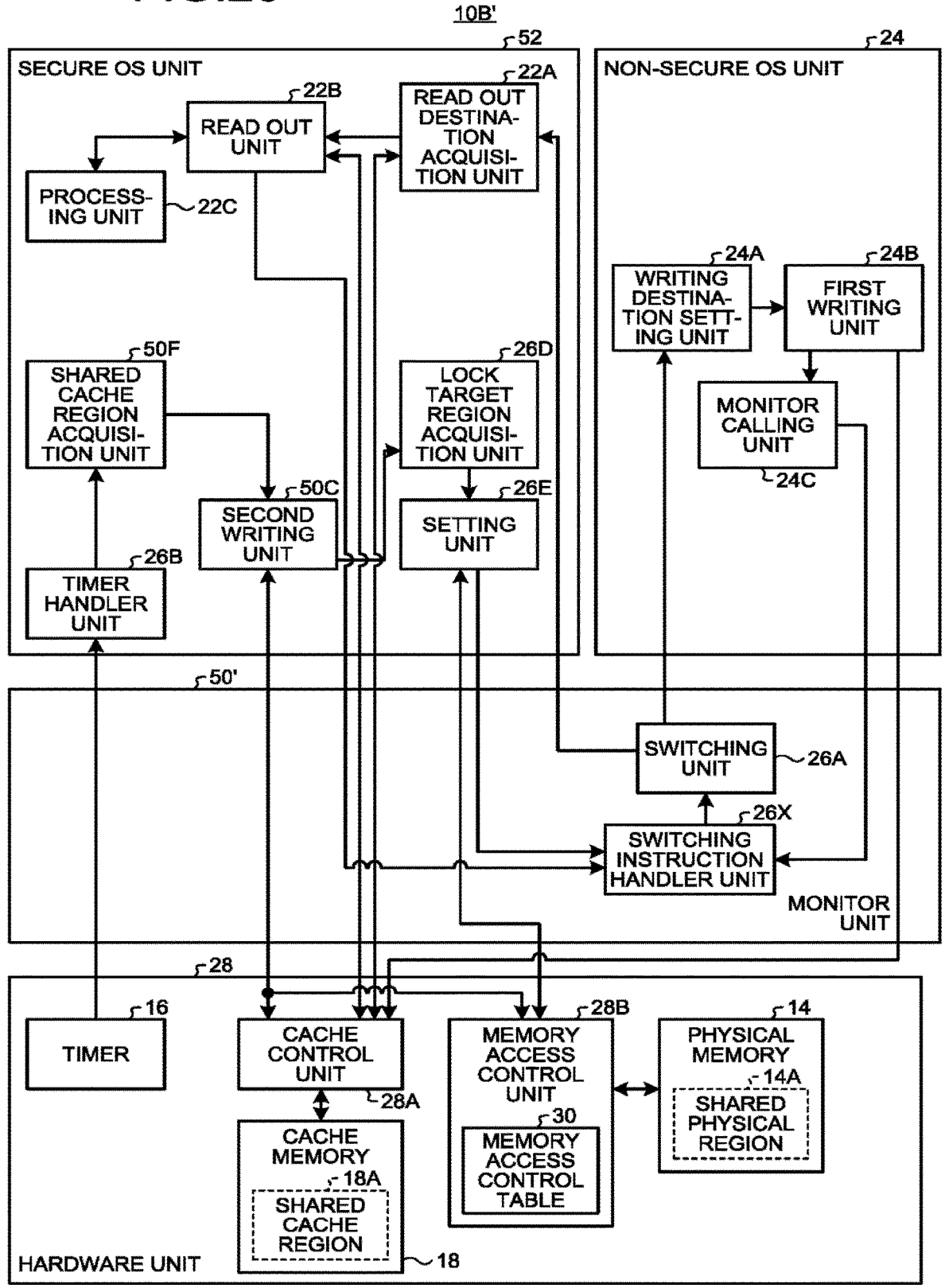
FIG. 20 is a schematic diagram of the information processing device according to a second modification.

FIG. 20 is a schematic diagram illustrating an example of an information processing device 10B' according to the present modification. The information processing device 10B' includes a secure OS unit 52, the non-secure OS unit 24, a monitor unit 50', and the hardware unit 28. The non-secure OS unit 24 and the hardware unit 28 are the same as those in the information processing device 10. The secure OS unit 52 and the monitor unit 50' are the same as those in the information processing device 10B according to the second embodiment except that the timer handler unit 26B, the shared cache region acquisition unit 50F, the second writing unit 50C, the lock target region acquisition unit 26D, and the setting unit 26E are arranged in the secure OS unit 52. The timer handler unit 26B, the shared cache region acquisition unit 50F, the second writing unit 50C, the lock target region acquisition unit 26D, and the setting unit 26E are the same as those in the second embodiment.

In this way, at least one of the timer handler unit 26B, the shared cache region acquisition unit 50F, the second writing unit 50C, the lock target region acquisition unit 26D, and the setting unit 26E may be arranged in the secure OS unit 52. At least one of the shared cache region acquisition unit 50F and the second writing unit 50C may be arranged in the non-secure OS unit 24.

Third Embodiment

In the second embodiment, described is a form of writing the processing target data 40A in the shared cache region 18A into the physical memory 14, and setting the shared physical region 14A of the physical memory 14 to be in the locked state L.

In the present embodiment, the following describes a form of writing the processing target data 40A in the shared cache region 18A into the physical memory 14, and setting, to be in the locked state L, a region into which the processing target data 40A is written in the shared physical region 14A.

Figure 21:
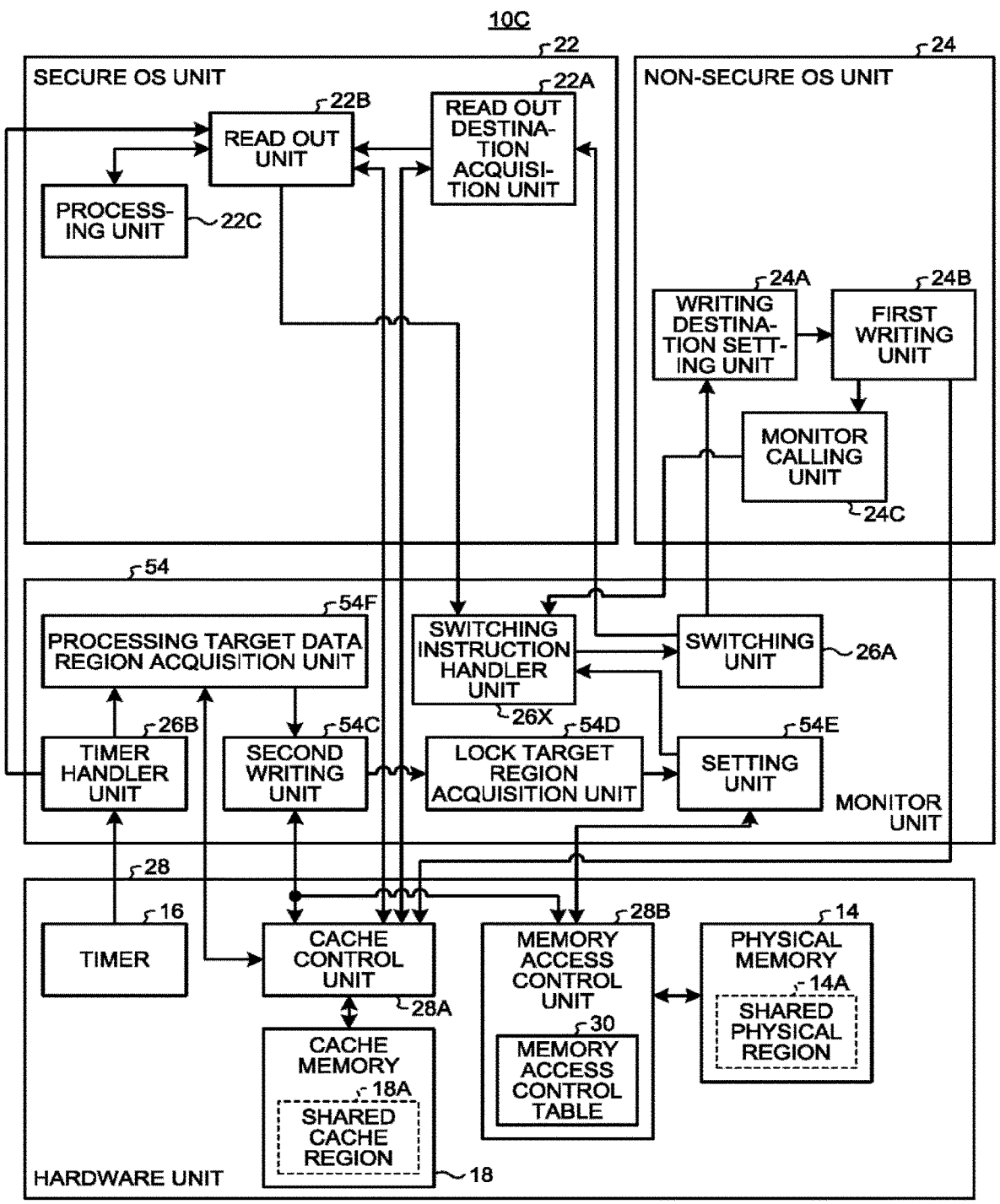
FIG. 21 is a diagram of a functional configuration of the information processing device according to a third embodiment.

FIG. 21 is a diagram illustrating an example of a functional configuration of an information processing device 10C according to a third embodiment.

The information processing device 10C includes the secure OS unit 22, the non-secure OS unit 24, a monitor unit 54, and the hardware unit 28. The information processing device 10C is the same as the information processing device 10 according to the first embodiment except that the monitor unit 54 is arranged in place of the monitor unit 26.

The monitor unit 54 includes the switching unit 26A, the timer handler unit 26B, a processing target data region acquisition unit 54F, a second writing unit 54C, a lock target region acquisition unit 54D, a setting unit 54E, and the switching instruction handler unit 26X. The switching unit 26A and the timer handler unit 26B are the same as those in the first embodiment.

The processing target data region acquisition unit 54F acquires, from the physical address 99X of the physical memory 14, a cache address of a region in which the processing target data 40A is stored in the cache memory 18. For example, the processing target data region acquisition unit 54F reads the processing content 40E included in the writing data 40 stored in the cache memory 18. The processing target data region acquisition unit 54F acquires the size of the processing target data from the read processing content 40E, and reads a corresponding cache address together with the physical address 99X of the physical memory 14 from the table of correspondence 32 (see FIG. 4) to acquire the cache address of the region in which the processing target data 40A is stored.

The second writing unit 54C instructs the cache control unit 28A to write the processing target data 40A in the cache memory 18 into the shared physical region 14A of the physical memory 14.

Specifically, the second writing unit 54C receives, from the processing target data region acquisition unit 54F, the cache address of the region in which the writing data 40 is stored in the cache memory 18. The second writing unit 54C then writes the processing target data 40A in the shared cache region 18A into the shared physical region 14A of the physical memory 14 via the cache control unit 28A and the memory access control unit 28B. Thus, the processing target data 40A stored in the shared cache region 18A is moved to the shared physical region 14A of the physical memory 14.

The second writing unit 54C may write, into the shared physical region 14A of the physical memory 14, the writing data 40 including the processing target data 40A in the shared cache region 18A. That is, the second writing unit 54C may write, into the shared physical region 14A, the processing target data 40A stored in the shared cache region 18A, the attribute, and the processing content 40E.

Figure 22:
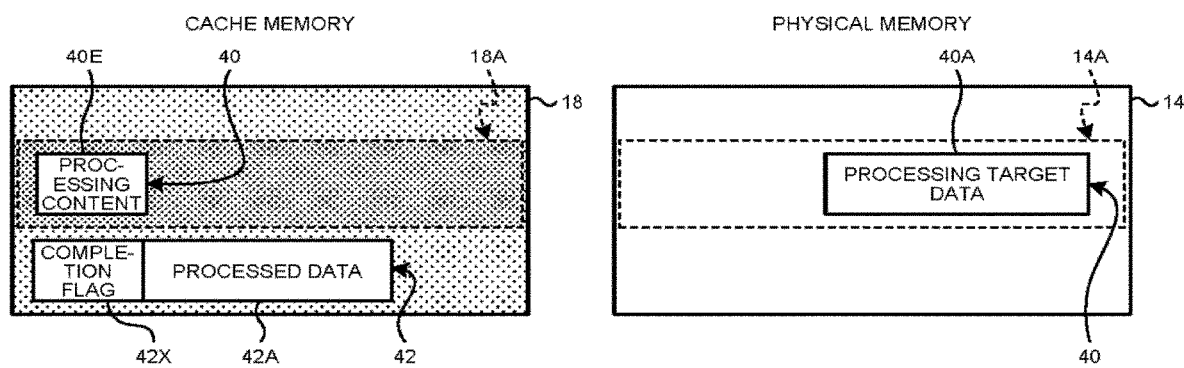
FIG. 22 is a schematic diagram of the cache memory and the physical memory.

FIG. 22 is a schematic diagram illustrating an example of the state of the cache memory 18 and the physical memory 14 at the time when the writing performed by the second writing unit 54C is ended. Through the writing performed by the second writing unit 54C, the processing target data 40A stored in the shared cache region 18A of the cache memory 18 is written into the shared physical region 14A of the physical memory 14. As described above, the second writing unit 54C may write the writing data 40 including the processing target data 40A into the shared physical region 14A.

Returning to FIG. 21, the description will be continued. The lock target region acquisition unit 54D acquires, as the lock target region, the region into which the processing target data 40A is written in the shared physical region 14A.

The setting unit 54E sets, to be in the locked state L, the region into which the processing target data 40A is written in the physical memory 14. By setting, to be in the locked state L, the lock target region acquired by the lock target region acquisition unit 54D, the setting unit 54E sets, to be in the locked state L, the region into which the processing target data 40A is written in the physical memory 14. The setting unit 54E may set, to be in the locked state L, the region into which the writing data 40 including the processing target data 40A is written in the shared physical region 14A.

Figure 23:
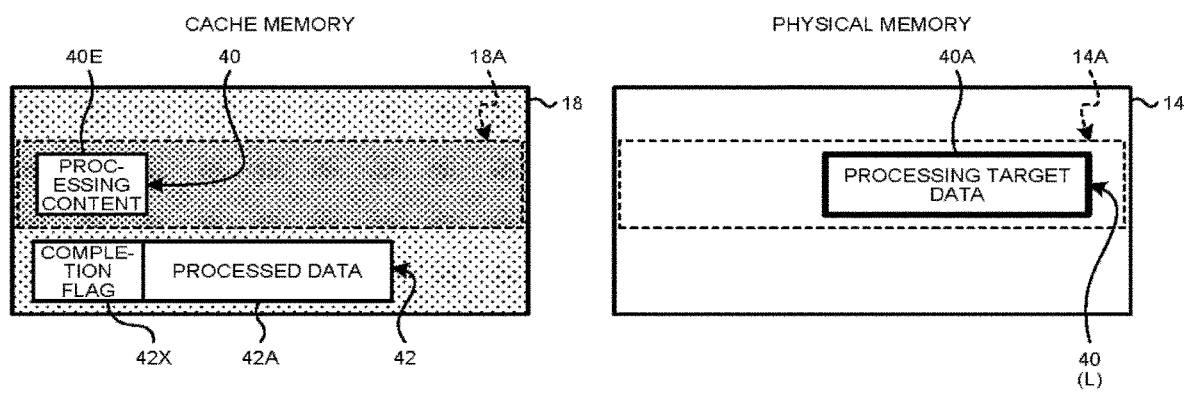
FIG. 23 is a schematic diagram of the cache memory and the physical memory.

FIG. 23 is a schematic diagram illustrating an example of the state of the cache memory 18 and the physical memory 14 at the time when the locked state is set by the setting unit 54E. As illustrated in FIG. 23, through the processing performed by the setting unit 54E, the region in which the processing target data 40A is stored in the shared physical region 14A is set to be in the locked state L.

In this way, in the present embodiment, the processing target data 40A in the shared cache region 18A is written into the physical memory 14, and the region into which the processing target data 40A is written in the shared physical region 14A is set to be in the locked state L. Thus, the processing target data 40A stored in the shared cache region 18A is written into the shared physical region 14A of the physical memory 14, and the region into which the processing target data 40A is written is set to be in the locked state L.

Figure 24:
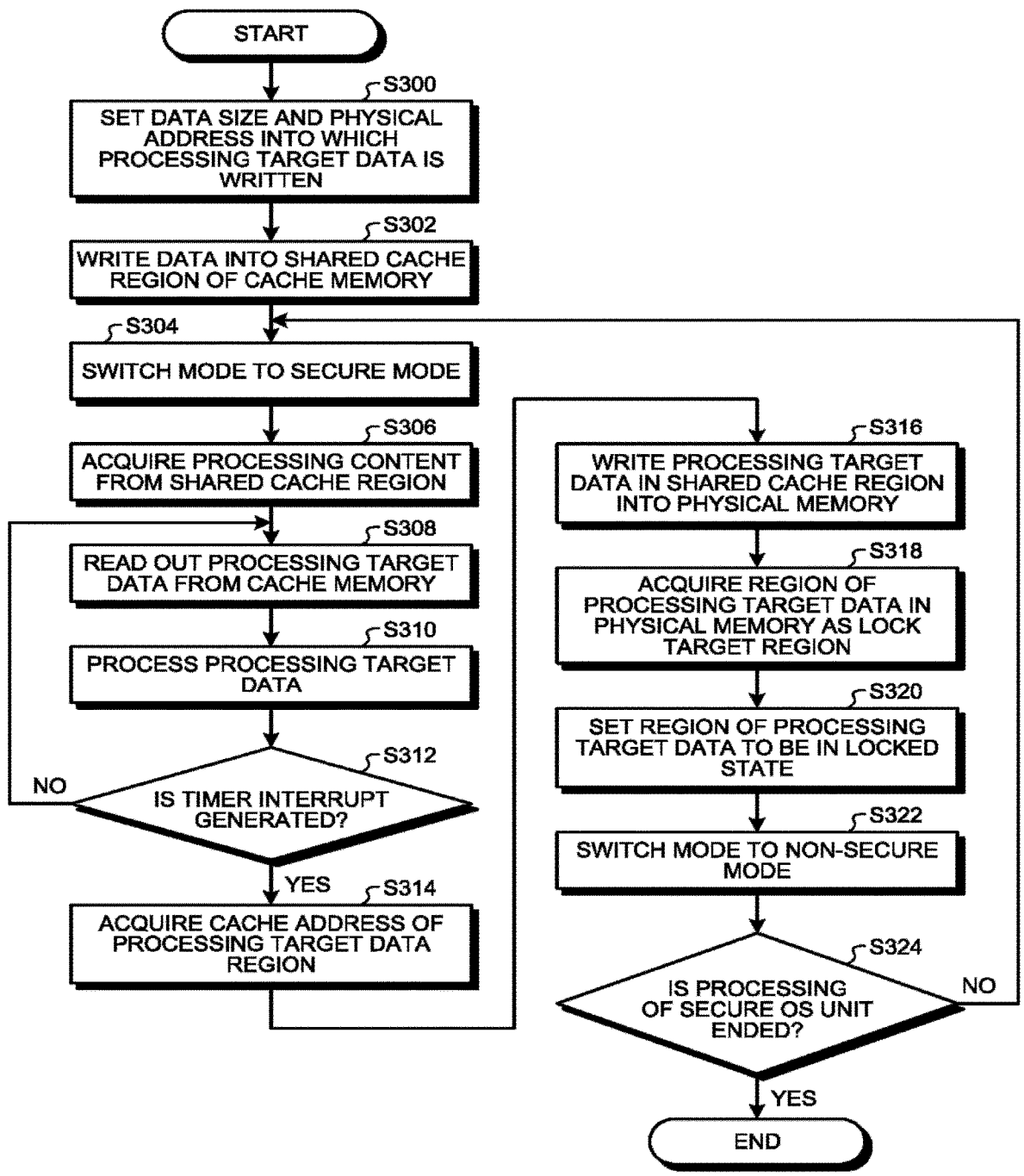
FIG. 24 is a flowchart of an information processing procedure.

Next, the following describes a procedure of information processing performed by the information processing device 10C according to the present embodiment. FIG. 24 is a flowchart illustrating an example of the procedure of the information processing performed by the information processing device 10C according to the present embodiment.

Similarly to the procedure (Step S100 to Step S112, see FIG. 11) of the information processing device 10, the information processing device 10C performs processing at Step S300 to Step S312.

Specifically, in the information processing device 10C, the writing destination setting unit 24A of the non-secure OS unit 24 sets the data size and the physical address of the physical memory 14 (Step S300). Next, the first writing unit 24B writes the processing target data 40A into the shared cache region 18A (Step S302). Next, the switching unit 26A switches the mode from the non-secure mode NS to the secure mode S (Step S304).

Next, the read out destination acquisition unit 22A of the secure OS unit 22 acquires the processing content 40E included in the writing data 40 written into the shared cache region 18A of the cache memory 18 (Step S306). Next, the read out unit 22B reads out the processing target data 40A in the cache memory 18 based on the processing content 40E (Step S308). The processing unit 22C performs processing indicated by the processing content 40E included in the writing data 40 on the processing target data 40A read out at Step S308 (Step S310).

Next, it is determined whether the timer 16 has caused an interrupt to be generated (Step S312). If a negative determination is made at Step S312 (No at Step S312), the process returns to Step S308. If a positive determination is made at Step S312 (Yes at Step S312), the process proceeds to Step S314.

Next, the processing target data region acquisition unit 54F acquires the cache address of the region in which the processing target data 40A is stored in the cache memory 18 (Step S314).

Next, the second writing unit 54C instructs the cache control unit 28A to write the processing target data 40A in the cache memory 18 into the shared physical region 14A of the physical memory 14 (Step S316).

Next, the lock target region acquisition unit 54D acquires, as the lock target region, the region into which the processing target data 40A is written in the shared physical region 14A (Step S318).

Next, the setting unit 54E sets, to be in the locked state L, the region into which the processing target data 40A is written in the physical memory 14 (Step S320).

Next, the switching unit 26A switches the mode from the secure mode S to the non-secure mode NS (Step S322). Next, the monitor calling unit 24C refers to the completion flag 42X included in the processing result 42 to determine whether the processing of the processing target data 40A at Step S310 performed by the secure OS unit 22 is ended (Step S324). If a negative determination is made at Step S324 (No at Step S324), the process returns to Step S304. On the other hand, if a positive determination is made at Step S324 (Yes at Step S324), this routine is ended.

As described above, in the information processing device 10C according to the present embodiment, the second writing unit 54C writes the processing target data 40A in the cache memory 18 into the shared physical region 14A of the physical memory 14. The setting unit 54E sets, to be in the locked state L, the region into which the processing target data 40A is written in the physical memory 14.

Thus, with the information processing device 10C according to the present embodiment, the non-secure OS unit 24 can be prevented from falsifying the processing target data 40A, and a risk of vulnerability incorporation can be reduced. The processing target data 40A in the shared cache region 18A is written into the physical memory 14 before the region into which the processing target data 40A is written in the physical memory 14 is set to be in the locked state L, so that an access error can be prevented from being caused at the time when the processing target data 40A of attribute "NS" is written into the physical memory 14.

Accordingly, with the information processing device 10C according to the present embodiment, real-time performance can be improved, a risk of vulnerability incorporation can be reduced, and an error can be prevented from being caused at the time of memory access.

With the information processing device 10C according to the present embodiment, a writing amount into the physical memory 14 can be reduced.

Third Modification

In the third embodiment, described is a case in which the monitor unit 54 includes the switching unit 26A, the timer handler unit 26B, the processing target data region acquisition unit 54F, the second writing unit 54C, the lock target region acquisition unit 54D, the setting unit 54E, and the switching instruction handler unit 26X (see FIG. 21). However, at least one of the timer handler unit 26B, the processing target data region acquisition unit 54F, the second writing unit 54C, the lock target region acquisition unit 54D, and the setting unit 54E may be arranged in the secure OS unit 22.

Figure 25:
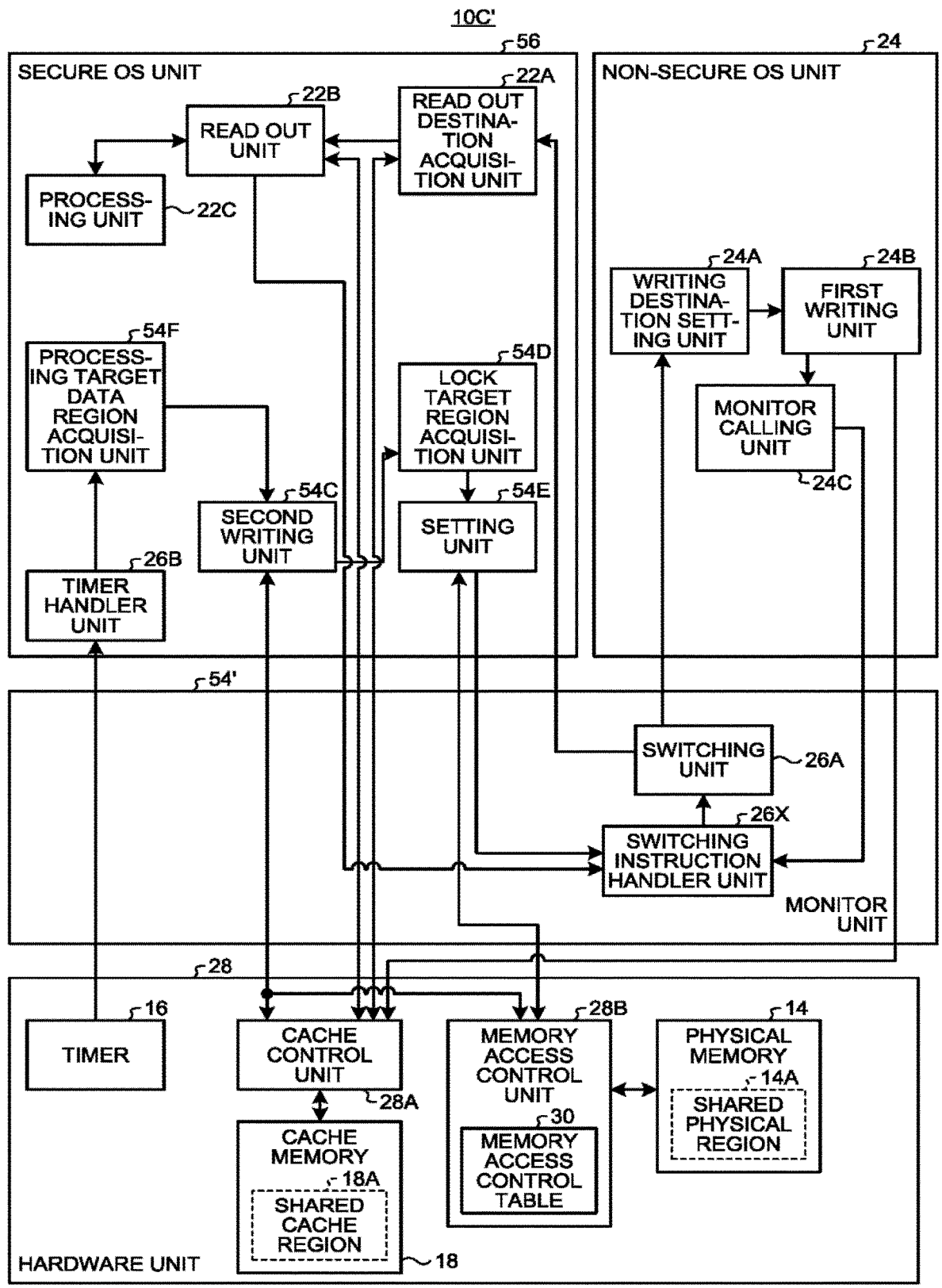
FIG. 25 is a schematic diagram of the information processing device according to a third modification.

FIG. 25 a schematic diagram illustrating an example of an information processing device 10C' according to a third modification. The information processing device 10C' includes a secure OS unit 56, the non-secure OS unit 24, a monitor unit 54', and the hardware unit 28. The non-secure OS unit 24 and the hardware unit 28 are the same as those in the information processing device 10. The secure OS unit 56 and the monitor unit 54' are the same as those in the information processing device 10C according to the third embodiment except that the timer handler unit 26B, the processing target data region acquisition unit 54F, the second writing unit 54C, the lock target region acquisition unit 54D, and the setting unit 54E are arranged in the secure OS unit 56. The timer handler unit 26B, the processing target data region acquisition unit 54F, the second writing unit 54C, the lock target region acquisition unit 54D, and the setting unit 54E are the same as those in the third embodiment.

In this way, at least one of the timer handler unit 26B, the processing target data region acquisition unit 54F, the second writing unit 54C, the lock target region acquisition unit 54D, and the setting unit 54E may be arranged in the secure OS unit 56. At least one of the processing target data region acquisition unit 54F and the second writing unit 54C may be arranged in the non-secure OS unit 24.

Fourth Embodiment

In the third embodiment, described is a form of writing the processing target data 40A in the shared cache region 18A into the physical memory 14, and setting, to be in the locked state L, the region into which the processing target data 40A is written in the shared physical region 14A.

In the present embodiment, the following describes a form of writing, into the physical memory 14, unread data that is not read out by the read out unit 22B of the secure OS unit 22 among the pieces of processing target data 40A in the shared cache region 18A, and setting, to be in the locked state L, the region into which the unread data is written in the physical memory 14.

Figure 26:
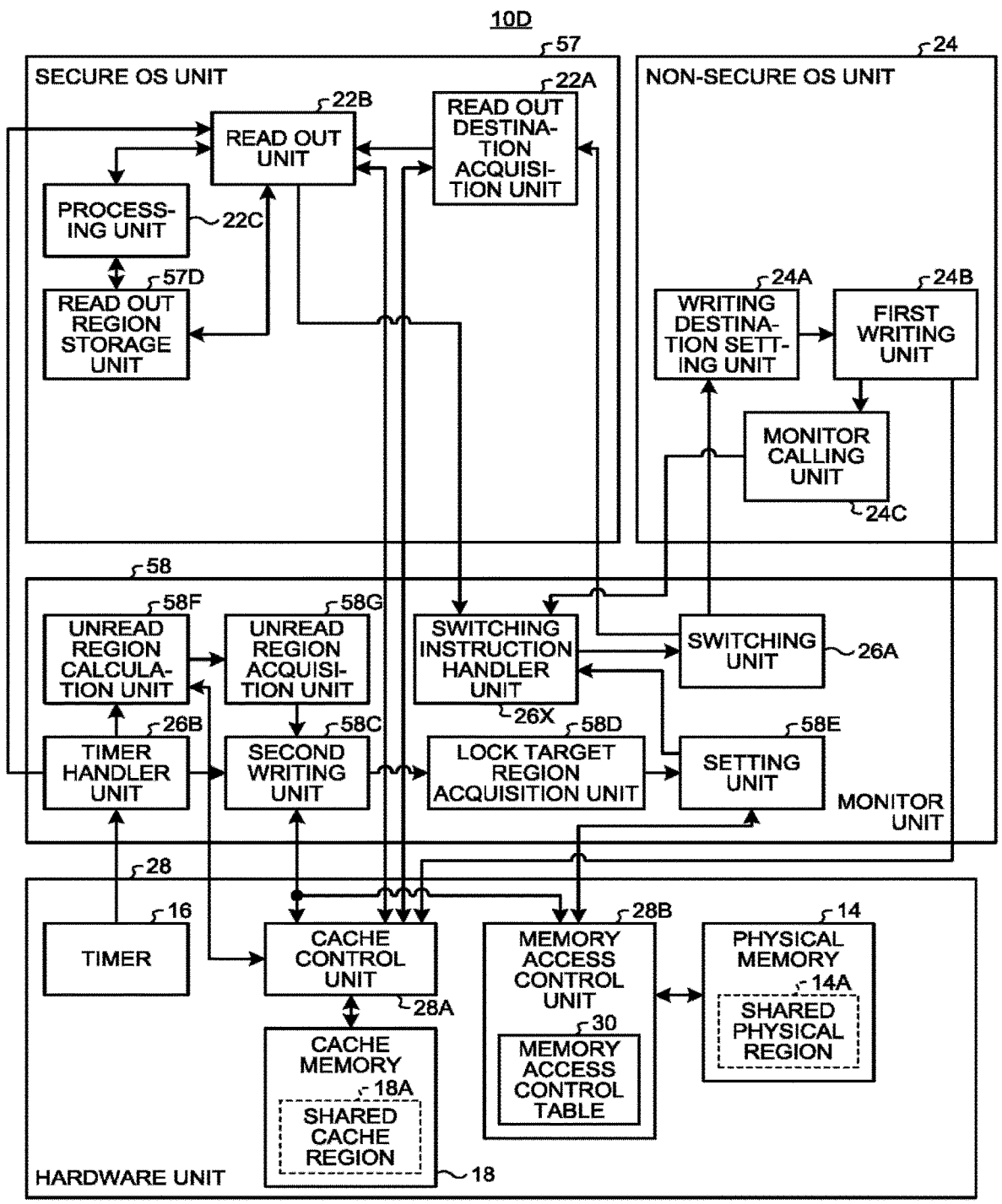
FIG. 26 is a diagram of a functional configuration of the information processing device according to a fourth embodiment.

FIG. 26 is a diagram illustrating an example of a functional configuration of an information processing device 10D according to a fourth embodiment.

The information processing device 10D includes a secure OS unit 57, the non-secure OS unit 24, a monitor unit 58, and the hardware unit 28. The non-secure OS unit 24 and the hardware unit 28 are the same as those in the first embodiment.

The secure OS unit 57 includes the read out destination acquisition unit 22A, the read out unit 22B, the processing unit 22C, and a read out region storage unit 57D. The secure OS unit 57 is the same as the secure OS unit 22 according to the first embodiment except to further include the read out region storage unit 57D.

The read out region storage unit 57D stores, in a general-purpose register of the processor 12, information indicating a region that has been already read out by the read out unit 22B among the pieces of processing target data 40A stored in the cache memory 18. The read out region storage unit 57D may store, in the general-purpose register, information indicating a region that has been read out by the read out unit 22B and processed by the processing unit 22C among the pieces of processing target data 40A.

For example, the read out region storage unit 57D uses, as a starting position, a physical address 40C included in the writing data 40 stored in the cache memory 18, and stores, in the general-purpose register, a range from the starting position that has been read out by the read out unit 22B and processed by the processing unit 22C. Thus, the range indicated by the physical address is sequentially stored in the general-purpose register as information indicating the region that has been read out by the read out unit 22B.

Next, the following describes the monitor unit 58. The monitor unit 58 includes the switching unit 26A, the timer handler unit 26B, an unread region calculation unit 58F, an unread region acquisition unit 58G, a second writing unit 58C, a lock target region acquisition unit 58D, a setting unit 58E, and the switching instruction handler unit 26X. The switching unit 26A and the timer handler unit 26B are the same as those in the first embodiment.

The unread region calculation unit 58F calculates the unread region that is not read out by the read out unit 22B indicated by the physical address in the processing target data 40A. Specifically, the unread region calculation unit 58F reads the physical address and the range indicating the region that has been read out by the read out unit 22B stored in the general-purpose register. The unread region calculation unit 58F then calculates the unread region using the physical address 40C and the data size 40D included in the writing data 40 stored in the shared cache region 18A, and the read out region that has been read. Specifically, the unread region calculation unit 58F calculates, as the unread region, the physical address and the data size indicating a physical region obtained by excluding the read out region from the physical region of the processing target data 40A indicated by the physical address 40C and the data size 40D included in the writing data 40.

The unread region acquisition unit 58G acquires information indicating the unread region. Specifically, the unread region acquisition unit 58G acquires a cache address and a data size corresponding to the physical address and the data size indicating the unread region calculated by the unread region calculation unit 58F. The unread region acquisition unit 58G reads, from the table of correspondence 32 (see FIG. 4), the cache address corresponding to the physical address indicating the unread region calculated by the unread region calculation unit 58F. The unread region acquisition unit 58G acquires, as the information indicating the unread region, the cache address and the data size calculated by the unread region calculation unit 58F.

The second writing unit 58C writ into the shared physical region 14A of the physical memory 14, the unread data that has not been read out by the read out unit 22B among the pieces of processing target data 40A in the cache memory 18.

Specifically, the second writing unit 58C receives, from the unread region acquisition unit 58G, the information indicating the unread region that has not been read out by the read out unit 22B in the processing target data 40A stored in the cache memory 18. The second writing unit 58C writes, into the shared physical region 14A of the physical memory 14, the unread data that has not been read out by the read out unit 22B among the pieces of processing target data 40A stored in the shared cache region 18A via the cache control unit 28A and the memory access control unit 28B. Due to this, the unread data among the pieces of processing target data 40A stored in the shared cache region 18A is moved to the shared physical region 14A of the physical memory 14.

Figure 27:
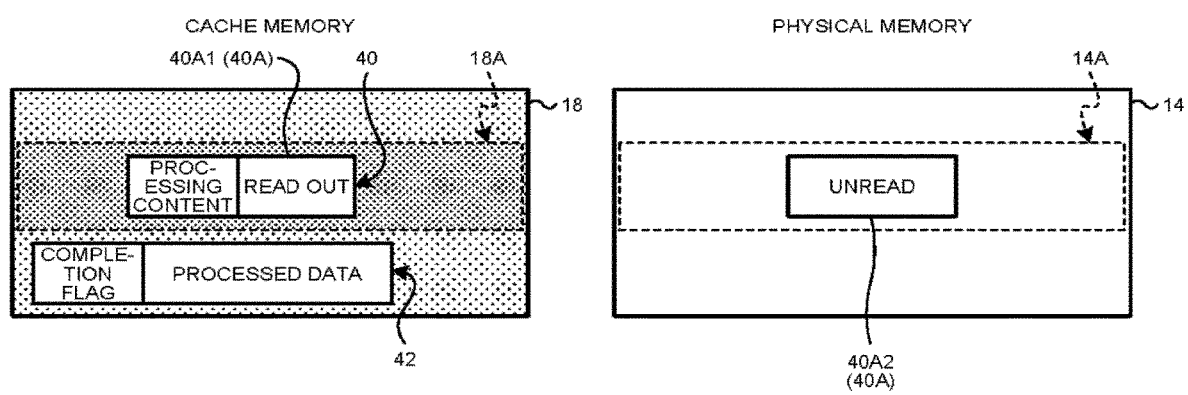
FIG. 27 is a schematic diagram of the cache memory and the physical memory.

FIG. 27 is a schematic diagram illustrating an example of the state of the cache memory 18 and the physical memory 14 at the time when the writing performed by the second writing unit 58C is ended. Through the writing performed by the second writing unit 58C, unread data 40A2 among the pieces of processing target data 40A stored in the shared cache region 18A of the cache memory 18 is written into the shared physical region 14A of the physical memory 14. On the other hand, read out data 40A1 that has been read out by the read out unit 22B among the pieces of processing target data 40A is left in the shared cache region 18A.

Returning to FIG. 26, the description will be continued. The lock target region acquisition unit 58D acquires, as the lock target region, the region into which the unread data 40A2 is written in the shared physical region 14A.

The setting unit 58E sets, to be in the locked state L, the region into which the unread data 40A2 is written in the physical memory 14. By setting the lock target region acquired by the lock target region acquisition unit 58D to be in the locked state L, the setting unit 58E sets, to be in the locked state L, the region into which the unread data 40A2 is written in the shared physical region 14A of the physical memory 14.

Figure 28:
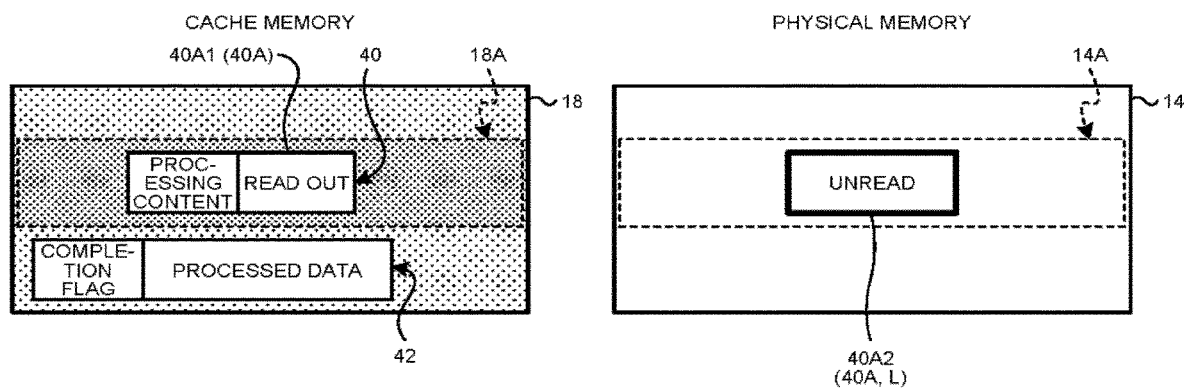
FIG. 28 is a schematic diagram of the cache memory and the physical memory.

FIG. 28 is a schematic diagram illustrating an example of the state of the cache memory 18 and the physical memory 14 at the time when the locked state is set by the setting unit 58E. As illustrated in FIG. 28, through the processing performed by the setting unit 58E, the region in which the unread data 40A2 is stored in the shared physical region 14A is set to be in the locked state L.

In this way, in the present embodiment, the unread data 40A2 that has not been read out by the read out unit 22B of the secure OS unit 57 among the pieces of processing target data 40A in the shared cache region 18A is written into the physical memory 14, and the region into which the unread data 40A2 is written in the physical memory 14 is set to be in the locked state L.

Figure 29:
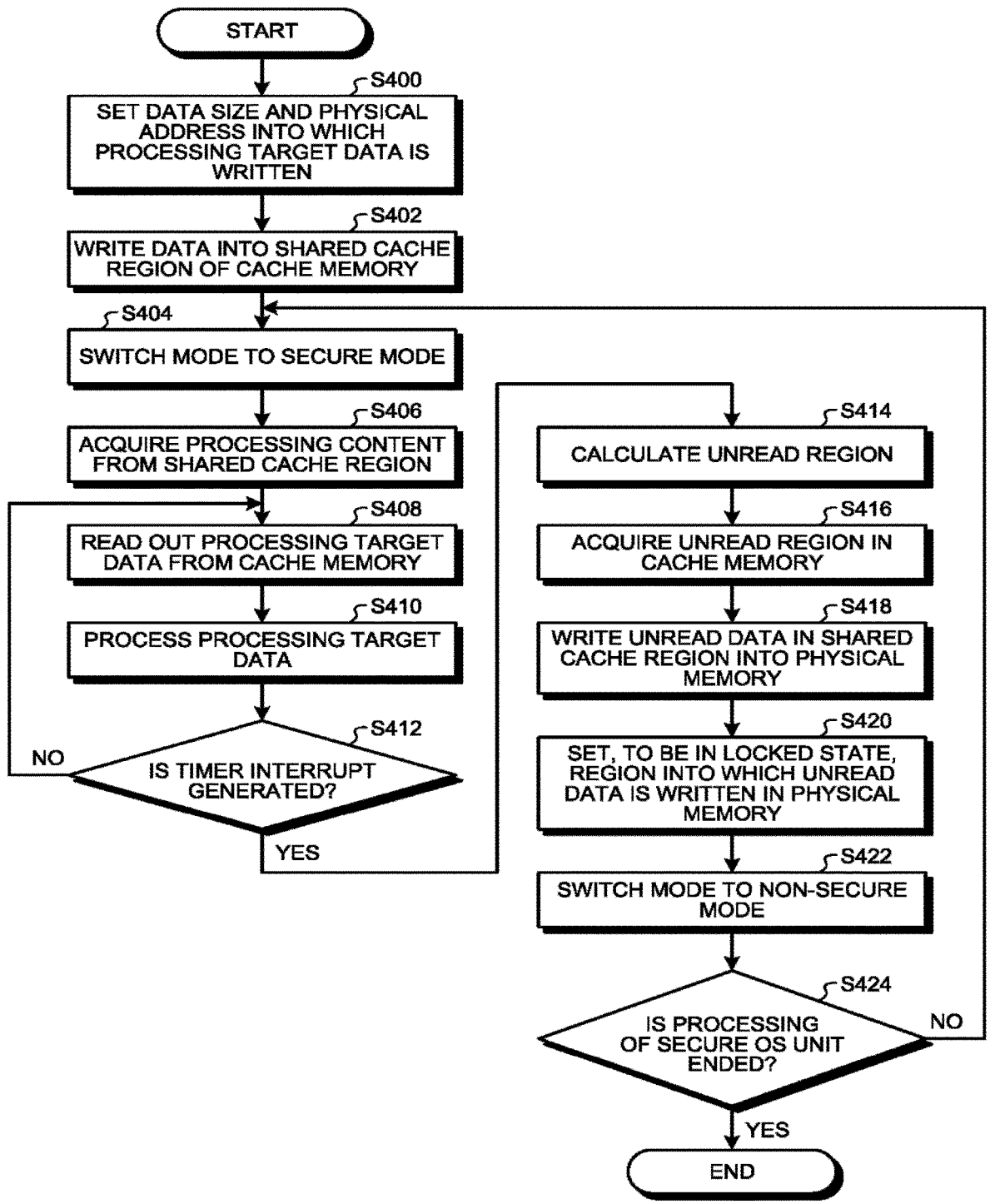
FIG. 29 is a flowchart of an information processing procedure.

Next, the following describes a procedure of information processing performed by the information processing device 10D according to the present embodiment. FIG. 29 is a flowchart illustrating an example of the procedure of the information processing performed by the information processing device 10D according to the present embodiment.

Similarly to the procedure (Step S100 to Step S112, see FIG. 11) of the information processing device 10, the information processing device 10C performs processing at Step S400 to Step S412.

Specifically, in the information processing device 10D, the writing destination setting unit 24A of the non-secure OS unit 24 sets the data size and the physical address of the physical memory 14 (Step S400). Next, the first writing unit 24B writes the processing target data 40A into the shared cache region 18A (Step S402). Next, the switching unit 26A switches the mode from the non-secure mode NS to the secure mode S (Step S404).

Next, the read out destination acquisition unit 22A of the secure OS unit 57 acquires the processing content 40E included in the writing data 40 written into the shared cache region 18A of the cache memory 18 (Step S406). Next, the read out unit 22B reads out the processing target data 40A in the cache memory 18 based on the processing content 40E (Step S408). The processing unit 22C performs processing indicated by the processing content 40E included in the writing data 40 on the processing target data 40A read out at Step S408 (Step S410).

Next, it is determined whether the timer 16 has caused an interrupt to be generated (Step S412). If a negative determination is made at Step S412 (No at Step S422), the process returns to Step S408. If a positive determination is made at Step S412 (Yes at Step S412), the process proceeds to Step S414.

Next, the unread region calculation unit 58F calculates the unread region that has not been read by the read out unit 22B indicated by the physical address in the processing target data 40A (Step S414). Next, the unread region acquisition unit 58G acquires information indicating the unread region indicated by the cache address (Step S416).

Next, the second writing unit 58C instructs the cache control unit 28A to write, into the shared physical region 14A of the physical memory 14, the unread data that has not been read out by the read out unit 22B among the pieces of processing target data 40A in the shared cache region 18A (Step S418) (see FIG. 27).

Next, the setting unit 58E sets, to be in the locked state L, the region into which the unread data 40A2 is written in the physical memory 14 (Step S420) (see FIG. 28).

Next, the switching unit 26A switches the mode from the secure mode S to the non-secure mode NS (Step S422). Next, the monitor calling unit 24C determines whether the processing of the processing target data 40A at Step S410 performed by the secure OS unit 57 is ended (Step S424). If a negative determination is made at Step S424 (No at Step S424), the process returns to Step S404. On the other hand, if a positive determination is made at Step S424 (Yes at Step S424), this routine is ended.

As described above, in the information processing device 10D according to the present embodiment, the second writing unit 58C writes, into the shared physical region 14A of the physical memory 14, the unread data 40A2 that has not been read out by the read out unit 22B among the pieces of processing target data 40A in the shared cache region 18A. The setting unit 58E sets, to be in the locked state L, the region into which the unread data 40A2 is written in the shared physical region 14A of the physical memory 14.

Thus, with the information processing device 10D according to the present embodiment, the non-secure OS unit 24 can be prevented from falsifying the unread data 40A2 that has not been read out by the read out unit 22B among the pieces of processing target data 40A, and a risk of vulnerability incorporation can be reduced. The unread data 40A2 in the shared cache region 18A is written into the physical memory 14 before the region into which the unread data 40A2 is written in the physical memory 14 is set to be in the locked state L, so that an access error can be prevented from being caused at the time when the processing target data 40A of attribute "NS" is written into the physical memory 14.

Thus, with the information processing device 10D according to the present embodiment, real-time performance can be improved, a risk of vulnerability incorporation can be reduced, and an error can be prevented from being caused at the time of memory access.

With the information processing device 10D according to the present embodiment, a writing amount into the physical memory 14 can be reduced.

Fourth Modification

In the fourth embodiment, described is a case in which the monitor unit 58 includes the timer handler unit 26B, the unread region calculation unit 58F, the unread region acquisition unit 58G, the second writing unit 58C, the lock target region acquisition unit 58D, the setting unit 58E, the switching unit 26A, and the switching instruction handler unit 26X FIG. 21). However, at least one of the timer handler unit 26B, the unread region calculation unit 58F, the unread region acquisition unit 58G, the second writing unit 58C, the lock target region acquisition unit 58D, and the setting unit 58E may be arranged in the secure OS unit 57.

Figure 30:
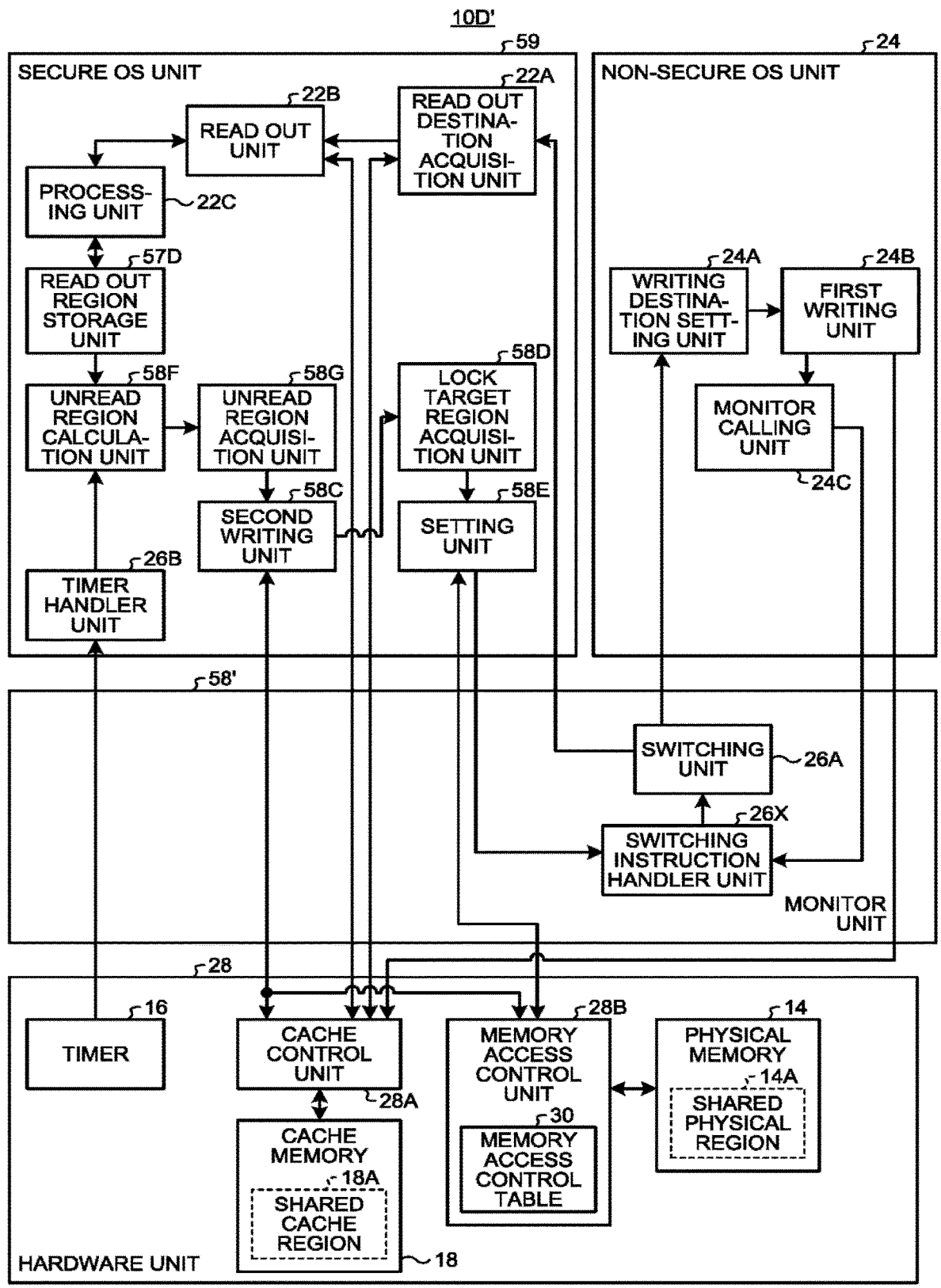
FIG. 30 is a schematic diagram of the information processing device according to a fourth modification.

FIG. 30 is a schematic diagram illustrating an example of an information processing device 10D' according to a fourth modification. The information processing device 10D' includes a secure OS unit 59, the non-secure OS unit 24, a monitor unit 58', and the hardware unit 28. The non-secure OS unit 24 and the hardware unit 28 are the same as those in the information processing device 10. The secure OS unit 59 and the monitor unit 58' are the same as those in the information processing device 10D according to the fourth embodiment except that the timer handler unit 26B, the unread region calculation unit 58F, the unread region acquisition unit 58G, the second writing unit 58C, the lock target region acquisition unit 58D, and the setting unit 58E are arranged in the secure OS unit 59. The timer handler unit 26B, the unread region calculation unit 58F, the unread region acquisition unit 58G, the second writing unit 58C, the lock target region acquisition unit 58D, and the setting unit 58E are the same as those in the fourth embodiment.

In this way, at least one of the timer handler unit 26B, the unread region calculation unit 58F, the unread region acquisition unit 58G, the second writing unit 58C, the lock target region acquisition unit 58D, and the setting unit 58E may be arranged in the secure OS unit 59.

Fifth Modification

The information processing devices 10, 10', 10B, 10B', 10C, 10C', 10D, and 10D' according to the embodiments and the modifications described above can be applied to various systems. For example, the information processing devices 10, 10', 10B, 10B', 10C, 10C', 10D, and 10D' according to the embodiments and the modifications described above can be applied to an onboard network system mounted on an automobile as an example of a mobile object.

For example, the information processing devices 10, 10', 10B, 10B', 10C, 10C', 10D, and 10D' according to the embodiments and the modifications described above can be applied to an onboard gateway device (hereinafter, abbreviated as "GW") included in the onboard network system.

FIG. 31 is a schematic diagram illustrating an outline of an information processing system 1 according to a fifth modification. The information processing system 1 is, for example, mounted on a vehicle 2.

The information processing system 1 includes the information processing device 10 and a plurality of nodes 60. The information processing system 1 may include any of the information processing device 10', the information processing device 10B, the information processing device 10B', the information processing device 10C, the information processing device 10C', the information processing device 10D, and the information processing device 10D' in place of the information processing device 10.

The information processing device 10 and the nodes 60 are connected to each other via a network NW. In the example illustrated in FIG. 31, the information processing system 1 includes a plurality of subnetworks (a subnetwork NW1, a subnetwork NW2) as the network NW. The node 60 is connected to each of the subnetworks. The subnetworks are connected to the information processing device 10.

A V2X communication module 64 and a communication module 66 are connected to the information processing device 10. The communication module 66 is a module for communicating with an external device via an external network 68. The V2X communication module 64 is a module for performing direct wireless communication with another vehicle 2 without using a communications infrastructure. As the direct wireless communication, for example, vehicle-to-vehicle/road-to-vehicle communication (vehicle-to-everything: V2X) is used. The V2X communication may be called car-to-X (C2X) communication in some cases.

FIG. 31 illustrates a case in which the information processing device 10 is configured as a GW by way of example. In the present embodiment, the information processing device 10 performs various pieces of processing described later in addition to an essential function as a gateway. The essential function as a gateway is, for example, a relay and filtering of communication between the subnetworks (for example, the subnetwork NW1, the subnetwork NW2) in the information processing system 1, a relay and filtering of communication between the information processing system 1 and the external network 68 outside the vehicle, and a relay and filtering of direct communication with another vehicle 2.

The node 60 is an electronic device that communicates data with the other node 60 via the information processing device 10. The node 60 is, for example, an electronic control unit (ECU), various sensors, and an actuator. The ECU is an electronic device that performs various control processes in the vehicle 2.

A communication standard of the information processing system 1 is not limited. The communication standard of the information processing system 1 is, for example, a controller area network (CAN) or FlexRay (registered trademark).

In this way, the information processing devices 10, 10', 10B, 10B', 10C, 10C', 10D, and 10D' according to the embodiments and the modifications may be applied to the information processing system 1 mounted on a mobile object such as the vehicle 2.

Supplementary Explanation

A computer program for executing the various pieces of processing described above performed by the information processing devices 10, 10', 10B, 10B', 10C, 10C', 10D, and 10D' according to the embodiments and the modifications may be stored in a hard disk drive (HDD). The computer program for executing the various pieces of processing described above performed by the information processing device 10 and the information processing device 10B according to the embodiments may be embedded and provided in a ROM, for example.

The computer program for executing the various pieces of processing described above performed by the information processing devices 10, 10', 10B, 10B', 10C, 10C', 10D, and 10D' according to the embodiments and the modifications may be stored and provided as a computer program product in a computer-readable storage medium such as a compact disc read only memory (CD-ROM), a compact disc-recordable (CD-R), a memory card, a digital versatile disc (DVD), and a flexible disk (FD), in an installable or executable file. The computer program for executing the various pieces of processing described above performed by the information processing devices 10, 10', 10B, 10B', 10C, 10C', 10D, and 10D' according to the embodiments and the modifications may be stored in a computer connected to a network such as the Internet and provided by being downloaded via the network. The computer program for executing the various pieces of processing described above performed by the information processing devices 10, 10', 10B, 10B', 10C, 10C', 10D, and 10D' according to the embodiments and the modifications may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device operating while switching between a secure mode and a non-secure mode, the information processing device comprising:
   processing circuitry configured to function as a switching unit, wherein
   the switching unit switches a mode from the secure mode to the non-secure mode at a time when the information processing device is operating in the secure mode;
   a physical memory; and
   a cache memory, wherein
   the processing circuitry is configured to further function as a setting unit, and
   the setting unit sets, before the mode is switched from the secure mode to the non-secure mode, at least part of a region in the physical memory shared by the secure mode and the non-secure mode to be in a locked state in which data that is written into the cache memory by a first writing unit operating in the non-secure mode is not enabled to be written into the physical memory and is enabled to be read.

2. The device according to claim 1, wherein
   the processing circuitry is configured to further function as a read out unit and a second writing unit,
   the read out unit operates in the secure mode, and reads out processing target data that is written into a shared cache region of the cache memory by the first writing unit; and the second writing unit writes, into the physical memory, at least part of the processing target data among pieces of cache data stored in the cache memory before the region is set to be in the locked state by the setting unit.

3. The device according to claim 2, wherein the setting unit sets, to be in the locked state, at least the region into which the data is written by the second writing unit in a shared physical region corresponding to the shared cache region in the physical memory.

4. The device according to claim 3, wherein
   the second writing unit writes, into the shared physical region of the physical memory, unread data that has not been read by the read out unit among pieces of the processing target data in the cache memory, and
   the setting unit sets, to be in the locked state, the region into which the unread data is written in the shared physical region of the physical memory.

5. The device according to claim 3, wherein
   the second writing unit writes, into the shared physical region of the physical memory, the processing target data in the cache memory, and
   the setting unit sets, to be in the locked state, the region into which the processing target data is written in the shared physical region of the physical memory.

6. The device according to claim 3, wherein the second writing unit writes, into the shared physical region of the physical memory, the cache data in the shared cache region in the cache memory.

7. The device according to claim 2, wherein the second writing unit writes, into the physical memory, all pieces of the cache data in the cache memory.

8. An information processing method executed by an information processing device including processing circuitry, a physical memory, and cache memory and configured to operate while switching between a secure mode and a non-secure mode, the information processing method comprising:

switching a mode from the secure mode to the non-secure mode at a time when the information processing device is operating, in the secure mode, and setting, before the mode is switched from the secure mode to the non-secure mode, at least part of a region in the physical memory shared by the secure mode and the non-secure mode to be in a locked state in which data that is written into the cache memory by a first writing unit operating in the non-secure mode is not enabled to be written into the physical memory and is enabled to be read.

9. A computer program product comprising a non-transitory computer-readable medium that includes a computer program to be executed by a computer that is executed by an information processing device including processing circuitry, a physical memory, and a cache memory and configured to operate while switching between a secure mode and a non-secure mode, the computer program causing the computer to perform:

switching a mode from the secure mode to the non-secure mode at a time when the information processing device is operating in the secure mode, and setting, before the mode is switched from the secure mode to the non-secure mode, at least part of a region in the physical memory shared by the secure mode and the non-secure mode to be in a locked state in which data that is written into the cache memory by a first writing unit operating in the non-secure mode is not enabled to be written into the physical memory and is enabled to be read.

* * * * *